(12) United States Patent
Angel et al.

(10) Patent No.: US 11,645,515 B2
(45) Date of Patent: *May 9, 2023

(54) AUTOMATICALLY DETERMINING POISONOUS ATTACKS ON NEURAL NETWORKS

(71) Applicant: International Business Machines Corporation, Armonk, NY (US)

(72) Inventors: Nathalie Baracaldo Angel, San Jose, CA (US); Bryant Chen, San Jose, CA (US); Biplav Srivastava, Rye, NY (US); Heiko H. Ludwig, San Francisco, CA (US)

(73) Assignee: International Business Machines Corporation, Armonk, NY (US)

(*) Notice: Subject to any disclaimer, the term of this patent is extended or adjusted under 35 U.S.C. 154(b) by 817 days.

This patent is subject to a terminal disclaimer.

(21) Appl. No.: 16/571,323

(22) Filed: Sep. 16, 2019

(65) Prior Publication Data

US 2021/0081831 A1 Mar. 18, 2021

(51) Int. Cl.
  *G06G 7/00* (2006.01)
  *G06N 3/08* (2023.01)
  (Continued)

(52) U.S. Cl.
  CPC .............. *G06N 3/08* (2013.01); *G06F 18/23* (2023.01); *G06F 18/24* (2023.01); *G06N 20/00* (2019.01);
  (Continued)

(58) Field of Classification Search
  CPC .......... G06N 20/00; G06N 3/08; G06N 7/005; G06K 9/6218; G06K 9/6267; G06K 9/6228; G06K 9/6262
  (Continued)

(56) References Cited

U.S. PATENT DOCUMENTS 8,762,298 B1 6/2014 Ranjan et al.
9,397,921 B2 7/2016 Urmanov et al.
(Continued)

OTHER PUBLICATIONS

Chen, B., et al., "Detecting Backdoor Attacks on Deep Neural Networks by Activation Clustering", arXiv:1811.03728v1, Nov. 9, 2018.

(Continued)

*Primary Examiner* — Thuy N Pardo
(74) *Attorney, Agent, or Firm* — Lieberman & Brandsdorfer, LLC

(57) ABSTRACT

Embodiments relate to a system, program product, and method for automatically determining which activation data points in a neural model have been poisoned to erroneously indicate association with a particular label or labels. A neural network is trained using potentially poisoned training data. Each of the training data points is classified using the network to retain the activations of the last hidden layer, and segment those activations by the label of corresponding training data. Clustering is applied to the retained activations of each segment, and a cluster assessment is conducted for each cluster associated with each label to distinguish clusters with potentially poisoned activations from clusters populated with legitimate activations. The assessment includes executing a set of analyses and integrating the results of the analyses into a determination as to whether a training data set is poisonous based on determining if resultant activation clusters are poisoned.

20 Claims, 18 Drawing Sheets

(51) Int. Cl.
*G06N 20/00* (2019.01)
*G06F 18/23* (2023.01)
*G06F 18/24* (2023.01)
*G06V 10/762* (2022.01)
*G06V 10/771* (2022.01)
*G06V 10/776* (2022.01)

(52) U.S. Cl.
CPC .......... *G06V 10/762* (2022.01); *G06V 10/771* (2022.01); *G06V 10/776* (2022.01)

(58) Field of Classification Search
USPC .................................................. 706/12, 19, 7
See application file for complete search history.

(56) References Cited

U.S. PATENT DOCUMENTS

| | | | |
|---|---|---|---|
| 9,762,611 | B2 | 9/2017 | Wallace et al. |
| 11,188,789 | B2 | 11/2021 | Chen et al. |
| 2014/0324429 | A1* | 10/2014 | Weilhammer ...... G10L 15/1815 704/244 |
| 2017/0230360 | A1* | 8/2017 | Mosenia ................. G16H 40/67 |
| 2017/0244746 | A1* | 8/2017 | Hawthorn ........... H04L 63/1433 |
| 2018/0336916 | A1 | 11/2018 | Baracaldo et al. |
| 2018/0348278 | A1* | 12/2018 | House .................. G06K 9/6276 |
| 2018/0349605 | A1 | 12/2018 | Wiebe et al. |
| 2018/0365139 | A1 | 12/2018 | Rajpal et al. |
| 2020/0003818 | A1* | 1/2020 | House .................. G06K 9/6276 |
| 2020/0019821 | A1* | 1/2020 | Baracaldo-Angel ... G06N 20/00 |
| 2020/0050945 | A1* | 2/2020 | Chen ....................... G06N 3/084 |
| 2020/0234515 | A1* | 7/2020 | Gronsbell ............. G06F 3/0482 |
| 2021/0182611 | A1* | 6/2021 | Li ......................... G06K 9/6256 |
| 2022/0121742 | A1* | 4/2022 | Strogov ................ G06F 21/554 |
| 2022/0210181 | A1* | 6/2022 | Hawthorn ........... H04L 63/1408 |

OTHER PUBLICATIONS

Wang, B., et al., "Neural Cleanse: Identifying and Mitigating Backdoor Attacks in Neural Networks", 40th IEEE Symposium on Security and Privacy, May 20-22, 2019.
Cao, Y., et al., "Efficient Repair of Polluted Machine Learning Systems via Casual Unlearning", Proceedings of the 2018 on Asia Conference on Computer and Communications Security, Jun. 2018.
Cao, Y., et al., "Towards Making Systems Forget with Machine Unlearning", 2015 IEEE Symposium on Security and Privacy, IEEE Computer Society, 2015.
Wang, G., et al., "Man vs. Machine: Practical Adversarial Detection of Malicious Crowdsourcing Workers", Proceedings of the 23 USENIX Security Symposion, Aug. 20-22, 2014.
Liu, K., et al., "Fine-Pruning: Defending Against Backdoor Attacks on Deep Neural Networks", arXiv:1805.12185v1, May 30, 2018.
Gu, T., et al., "BadNets: Identifying Vulnerabilities in Machine Learning Model Supply Chain", arXiv:1708.06733, Aug. 2017.
Baracaldo, N., et al., "Mitigating Poisoning Attacks on Machine Learning Models: A Data Provenance Based Approach," Proceedings of the 10th ACM Workshop on Artificial Intelligence and Security, Nov. 3, 2017.
Laishram, R., et al., "Curie: A method for protecting SVM Classifier from Poisoning Attack", arXiv:1606.01584v2, Jun. 7, 2016.
Al-Zoubi, M., et al., "New Outlier detection Method Based on Fuzzy Clustering",WSEAS Transactions on Information Science and Applications, Issue 5, vol. 7, May 2010.
Zhang, Ji, "Detecting Outlying Subspaces for High-Dimensional Data: A Heuristic Search Approach", Proceedings of the 2005 SIAM International Workshop on Feature Selection for Data Mining: Interfacing Machine Learning and Statistics, 2005.
Khurana, N., et al., "Preventing Poisoning Attacks on AI Based Threat Intelligence Systems" arXiv:1807.07418v1, Jun. 19, 2018.
Yang, C., et al., "Generative Poisoning Attack Method Against Neural Networks", arXiv:1703.01340v1, Mar. 3, 2017.
Molloy, I., et al., "Adversarial Machine Learning", Sep. 14, 2018.
Bhargava, Bharat, Cybersecurity Research Consortium, NGCRC Project Proposal for Secure Intelligence Autonomous Systems with Cyber Attribution, Oct. 6, 2018.
Anonymous, Using Deep Learning on Rule-Based Malicious Traffic Detectors to Generate New Malicious-Like Traffic for Layer 4-7 Testing, ip.com, Dec. 26, 2018.
Grill, Martin, "Detecting Malicious Network Behavior Using Only TCP Flag Information", ip.com, Aug. 6, 2014.
Anonymous, "Systems and Method for Preventing Automated Attacks", ip.com, May 1, 2014.
List of IBM Patents or Applications Treated as Related, Sep. 2019.
Office Action, U.S. Appl. No. 16/571,318, dated May 16, 2022.
Office Action, U.S. Appl. No. 16/571,321, dated May 16, 2022.

* cited by examiner

| Seq. No. (404) | Data Type (406) | Noise Distribution (408) | Suspected Poison Existence (410) | Topics (412) | True Labels (414) | Clusters (k) by Class (416) | Decision (418) |
|---|---|---|---|---|---|---|---|
| 1 | Any | | Yes | | $N_{i,Total}$ | # Clusters = 2 | Poison Cluster with Smallest Size |
| 2 | | | | | $N_{i,Total}$ | # Clusters = 1 | No Poison |
| 3 | Text | | Yes | $j_{Total}$ | $N_{i,Total}$ | # Clusters = $N_{i,Total}$ + 1 | Poison: Non-Label Cluster |
| 4 | Text | | Yes; Backdoor = Poison | $j_{Total}$; Topic is Described by Words Including Poison | $N_{i,Total}$ ($j_{Total} < N_{i,Total}$) | # Clusters = $j_{Total}$ + 1; at Least One Cluster has Poison | Poison: Cluster with Max Poison |
| 5 | Any | Yes | Yes | | $N_{i,Total}$ | # Clusters = 2, Size of Smaller Cluster is Less than Expected Noise | Poison |
| 6 | Text | | | $j_{Total}$; Topic $j$ is Described by Words Including Poison | $N_{i,Total}$ ($j_{Total} < N_{i,Total}$) | # Clusters = $j_{Total}$; Find Topics on Each Cluster | Poison: Cluster with Max Poison |
| 7 | Any | | | | $N_{i,Total}$ | Compare Smaller Cluster with Other Clusters and See if Resulting Clusters are More Cohesive | Re-Label Data Accordingly |
| 8 | Text | | | Known | $N_{i,Total}$ | Each Cluster has Disjoint Topic | Run Relabeling Step 7 or Ask Human |
| 9 | Text | | | Known | $N_{i,Total}$ | Topics Found are Racist/Bais in Sub-Cluster | Poison |

FIG. 4

AUTOMATICALLY DETERMINING POISONOUS ATTACKS ON NEURAL NETWORKS

BACKGROUND

The present embodiments relate to an artificial intelligence platform and an optimization methodology to detect presence of poisonous data in a training data set. More specifically, the embodiments relate to executing a set of analyses and integrating the results of the analyses into a determination as to whether a training data set is poisonous based on determining if resultant activation clusters are poisoned.

SUMMARY

The embodiments include a system, computer program product, and method for assessing an untrusted training data set for presence of poisonous data therein, and application of one or more remediating actions.

In one aspect, a computer system is provided to support an artificial intelligence (AI) platform. As shown, a processor is operatively coupled to the memory and is in communication with the AI platform. The AI platform is provided with tools to process an untrusted data set. The tools include a training manager which functions to train a neural model with an untrusted data set, and a machine learning (ML) manager which functions to classify each data point in the untrusted data set using the trained neural model, and to retain activations of one or more designated layers in the trained neural model. The tools also include a cluster manager which functions to apply a clustering technique on the retained activations for each label, and for each cluster, to assess integrity of data in the cluster. The integrity of the data is assessed through analyzing extracted information from the untrusted training data set and the clustered activations. The content of the data in the untrusted training data set is leveraged to determine if the data content is image or text data. In addition, the noise distribution of the data and a preliminary cluster classification for each cluster is determined. A classification manager functions to assign a classification to the assessed cluster, where the cluster classification corresponds to the integrity assessment. The cluster classification is one of poisonous and legitimate.

In another aspect, a computer program product is provided to utilize machine learning to process an untrusted training data set. The computer program product includes a computer readable storage medium with embodied program code that is executable by a processing unit. Program code is provided to train a neural model with the untrusted data set and classify each data point in the untrusted data set using the trained neural model. The program code retains activations of one or more designated layers in the trained neural model and applies a clustering technique on the retained activations for each label. For each cluster, program code assesses the integrity of the data in the cluster. The assessment is directed at the integrity of the data through analyzing extracted information from the untrusted training data set and the clustered activations. The content of the data in the untrusted training data set is leveraged to determine if the data content is image or text data. In addition, the noise distribution of the data and a preliminary cluster classification for each cluster is determined. Upon completion of the integrity assessment, a classification of either poisonous or legitimate is assigned to the assessed cluster.

In yet another aspect, a method is provided to utilize machine learning to process an untrusted training data set. A neural network receives the untrusted training data set, where each data point of the untrusted data set has a label. A neural model is trained using the untrusted data set. Each data point in the untrusted data set is classified using the trained neural model, and activations of one or more designated layers in the trained neural model are retained. A clustering technique is applied on the retained activations for each label, and an integrity assessment is conducted for each cluster. The integrity assessment of the data includes analyzing extracted information from the untrusted training data set and the clustered activations. The content of the data in the untrusted training data set is leveraged to determine if the data content is image or text data. In addition, the noise distribution of the data and a preliminary cluster classification for each cluster is determined. Upon completion of the integrity assessment, a classification of either poisonous or legitimate is assigned to the assessed cluster.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments, unless otherwise explicitly indicated.

FIG. 4 depicts a block diagram of a data structure populated with the results of a plurality of analyses executed on the untrusted training data set and the activation clusters formed from the untrusted training data set.

DETAILED DESCRIPTION

Figure 1:
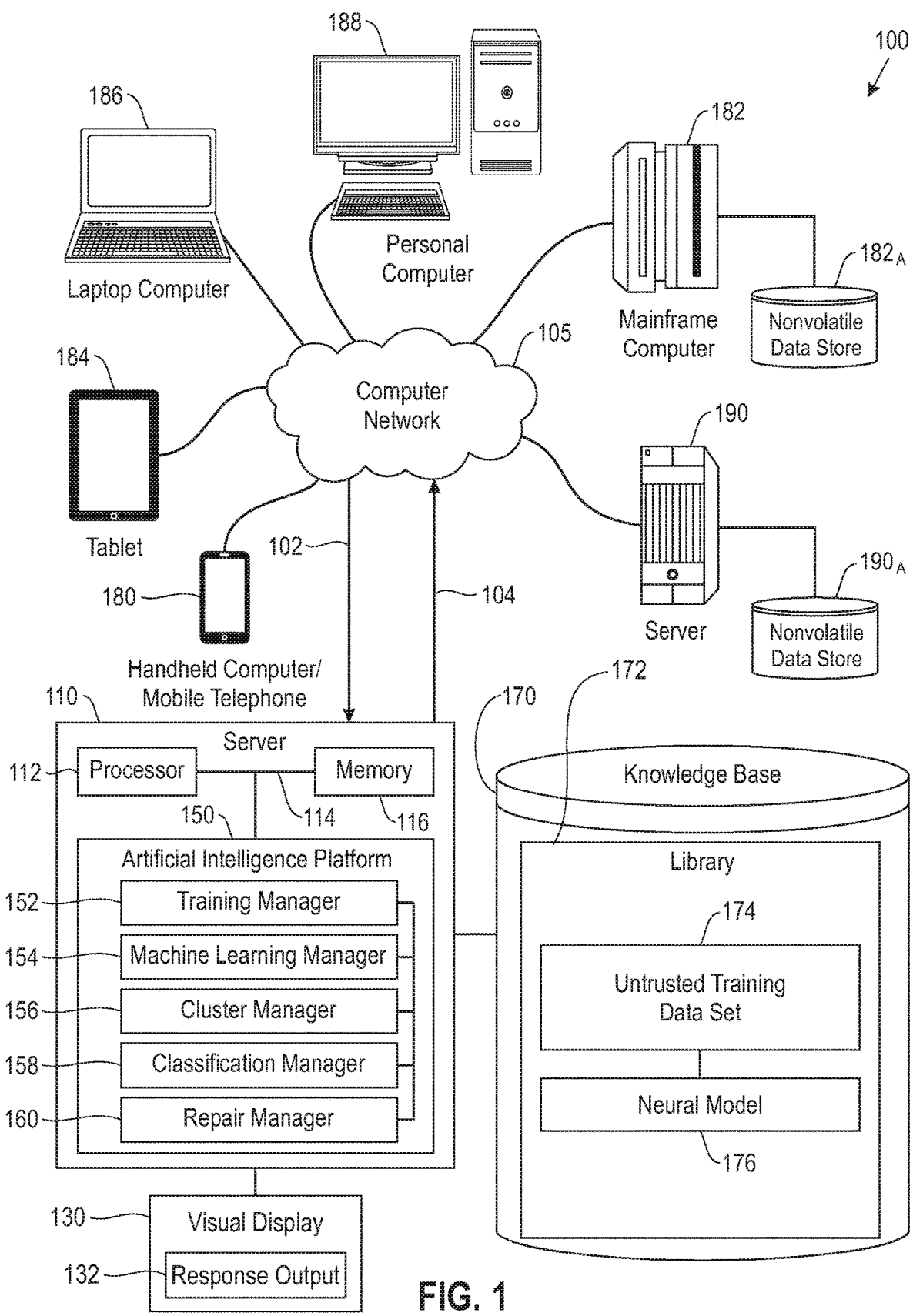
FIG. 1 depicts a system diagram illustrating an artificial intelligence platform computing system.

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Artificial Intelligence (AI) relates to the field of computer science directed at computers and computer behavior as related to humans. AI refers to the intelligence when machines, based on information, are able to make decisions, which maximizes the chance of success in a given topic. More specifically, AI is able to learn from a data set to solve problems and provide relevant recommendations. For example, in the field of artificial intelligent computer systems, natural language systems (such as the IBM Watson® artificially intelligent computer system or other natural language interrogatory answering systems) process natural language based on system acquired knowledge. To process natural language, the system may be trained with data derived from a database or corpus of knowledge, but the resulting outcome can be incorrect or inaccurate for a variety of reasons.

Machine learning (ML), which is a subset of AI, utilizes algorithms, represented as machine processable models, to learn from data and create foresights based on this data. More specifically, ML is the application of AI through creation of neural networks that can demonstrate learning behavior by performing tasks that are not explicitly programmed. Deep learning is a type of neural-network ML in which systems can accomplish complex tasks by using multiple layers of choices based on output of a previous layer, creating increasingly smarter and more abstract conclusions.

At the core of AI and associated reasoning lies the concept of similarity. The process of understanding natural language and objects requires reasoning from a relational perspective that can be challenging. Structures, including static structures and dynamic structures, dictate a determined output or action for a given determinate input. More specifically, the determined output or action is based on an express or inherent relationship within the structure. This arrangement may be satisfactory for select circumstances and conditions. However, it is understood that dynamic structures are inherently subject to change, and the output or action may be subject to change accordingly. Existing solutions for efficiently identifying objects and understanding natural language and processing content response to the identification and understanding as well as changes to the structures are extremely difficult at a practical level.

Deep learning is a method of machine learning that incorporates neural networks in successive layers to learn from data in an iterative manner. Neural networks are models of the way the nervous system operates. Basic units are referred to as neurons, which are typically organized into layers. The neural network works by simulating a large number of interconnected processing units that resemble abstract versions of neurons. There are typically three parts in a neural network, including an input layer, with units representing input fields, one or more hidden layers, and an output layer, with a unit or units representing target field(s). The units are connected with varying connection strengths or weights. Input data are presented to the first layer, and values are propagated from each neuron to every neuron in the next layer. At a basic level, each layer of the neural network includes one or more operators or functions operatively coupled to output and input. Output from the operator(s) or function(s) of the last hidden layer is referred to herein as activations. Eventually, a result is delivered from the output layers. Deep learning complex neural networks are designed to emulate how the human brain works, so computers can be trained to support poorly defined abstractions and problems. Neural networks and deep learning are often used in image recognition, speech, and computer vision applications.

AI, especially deep learning, has made significant progress in a lot of areas, such as autonomous driving, machine translation, and speech recognition, with profound impact on our society. However, neural models that are trained on data from untrustworthy sources provide adversaries with an opportunity to manipulate the model by inserting carefully crafted samples into the training set. An untrusted training data set, also referred to herein as a training set, may include some combination of legitimate data and poisonous data. As used herein, legitimate data includes data resident within the training data set that has not been subject to tampering. Also, as used herein, poisonous data is data resident within the training data set that has been tampered with through at least the mechanisms as described herein.

In one embodiment, poisonous data may be inserted into the untrusted training set by adding a backdoor trigger embedded into data points that are also erroneously labeled to a target class within the poisonous data. A neural network trained using the poisonous data allows an adversary to ensure the neural network misclassifies samples that present the adversary's chosen backdoor trigger. As used herein, an adversary is at least one entity with an intent to corrupt a neural model through alteration of model behavior by manipulating the data that is used to train the model, i.e., the untrusted training data set, thereby effecting a source-target misclassification attack, sometimes referred to as a targeted attack or backdoor attack, and hereon referred to as a poisoning attack. The adversary may perform a poisoning attack on a neural network model through manipulation of the training data set that will be used to train the model, thereby corrupting the model in a manner that may be undetected.

Referring to FIG. 1, a schematic diagram of an artificial intelligence platform computing system (100) is depicted. As shown, a server (110) is provided in communication with a plurality of computing devices (180), (182), (184), (186), (188), and (190) across a network connection (105). The server (110) is configured with a processing unit (112) in communication with memory (116) across a bus (114). The server (110) is shown with an artificial intelligence (AI) platform (150) for cognitive computing, including machine learning, over the network (105) from one or more of the computing devices (180), (182), (184), (186), (188), and (190). More specifically, the computing devices (180), (182), (184), (186), (188), and (190) communicate with each other and with other devices or components via one or more wired and/or wireless data communication links, where each communication link may comprise one or more of wires, routers, switches, transmitters, receivers, or the like. In this networked arrangement, the server (110) and the computer network (105) enable communication detection, recognition, and resolution. The server (110) is in operative communication with the computer network through communications links (102) and (104). Links (102) and (104) may be wired or wireless. Other embodiments of the server (110) may be used with components, systems, sub-systems, and/or devices other than those that are depicted herein.

The AI platform (150) is shown herein configured with tools to enable supervised learning. The tools function to implement an optimized methodology for detecting and removing or repairing poisoned data within a neural network resulting from poisonous data inserted into the training data. It is understood in the art that in one embodiment, insertion of poisonous data may be through one or more backdoors and corresponding backdoor techniques. In one embodiment, machine learning techniques are used to train the AI platform (150) to detect and remove or repair the poisoned data.

The tools shown herein include, but are not limited to, a training manager (152), a machine learning (ML) manager (154), a cluster manager (156), a classification manager (158), and a repair manager (160). The AI platform (150) may receive input from the network (105) and leverage a data source (170), also referred to herein as a corpus or knowledge base, to selectively access training and other data. As shown the data source (170) is configured with a library (172) with a plurality of data sets and corresponding neural models that are created and managed by the ML manager (154). Details of how the training data and the models are created and used are shown and described in detail below. An untrusted training data set (174) is shown herein as an example data set. A neural model corresponding to the data set is shown herein as neural model (176). Although only one data set and corresponding neural model are shown, this quantity should not be considered limiting. Accordingly, the data set and corresponding neural model are shown local to the knowledge base (170) that is operatively coupled to the server (110) and the AI platform (150).

It is understood in the art that the supervised learning leverages data from a data source. As shown herein, the data source is referred to as the knowledge base (170) and is configured with logically grouped data used to train the model(s). The training manager (152) functions to collect or extract data from the various computing devices (180), (182), (184), (186), (188), and (190) in communication with the network (105). Once collected, the ML manager (154) organizes or arranges the collected data from one or more of the computing devices into the corresponding training data set (174) to be used to train the respective model (176). Neural model (176) is shown operatively coupled to untrusted training data set (174). The training data set (174) is updated by the training manager (152), and the model (176) is configured and operatively coupled to the respective training data set (174) that is dynamically managed and updated by the ML manager (154). Accordingly, the training manager (152) uses the untrusted training data set (174) to train the trained neural model (176).

It is understood that in one embodiment data may be collected at periodic intervals. The training manager (152) collects the data or changes in the data for the untrusted training data set (174). The ML manager (154) reflects the collected or changed data in the operatively coupled model(s) (176). In one embodiment, the training manager (152) may function in a dynamic manner, including, but not limited to, detecting changes to the collected data, and collecting the changed data. Similarly, the ML manager (154) utilizes one or more ML algorithm(s) to update the corresponding model (176) to reflect and incorporate the data changes. In one embodiment, the training manager (152) may function in a sleep or hibernate mode when inactive, e.g. not collecting data, and may change to an active mode when changes to relevant or pertinent data are discovered. Accordingly, the training manager (152) functions as a tool to collect and organize data from one or more computing devices, with the ML manager (154) reflecting the organized data (174) into model (176).

The ML manager (154), which is shown herein operatively coupled to the training manager (152), functions as a tool to classify each data point in the untrusted data set (174) using the trained neural model (176), and to retain activations of one or more designated layers in the trained neural model (176). The ML manager (154) employs a segmentation algorithm to segment the retained activations resulting from the trained neural model (176) as a function of the assigned data classification labels. In one embodiment, the ML manager (154) shapes each of the segmented activations into a flattened, single one-dimensional vector. Accordingly, the ML manager (154) interfaces with the training manager (152) to perform the initial classification on the untrusted data set (174) and to segment and flatten the resulting activations in preparation for further analysis of the segments.

The cluster manager (156), shown herein as operatively coupled to the ML manager (154) and the training manager (152), functions as a tool to apply a clustering technique on the retained, segmented, and in one embodiment flattened activations, associated with each label. In one embodiment, the clustering technique includes an automatic clustering analysis tool, e.g., a k-means algorithm, to divide the activations into appropriate clusters. The value of k is configurable. In one embodiment, the value of k is 2. Similarly, in one embodiment, an alternative clustering analysis tool may be employed. Accordingly, the cluster manager (156) manages and maintains a status for each cluster associated with an assigned label.

The cluster manager (156) assesses the integrity of the data in each cluster to determine if the cluster being analyzed is potentially poisoned or contains only legitimate data. The cluster manager (156) uses computational methods to perform the integrity assessments. In one embodiment, the computational methods include, but are not limited to, determining the type of data resident within the untrusted training data set (174), the associated noise distribution, and if there is evidence indicating poisonous data within the training data set (174). The computational methods further include determining the number of topics within each cluster of textual data and if any of the topics include suspicious or clearly poisonous text. The computational methods also include analyzing the number of clusters associated with each classification or label to determine if one or more poisoned clusters have been generated. In one embodiment, the smaller quantity of data points are identified or considered to contain poisonous data, and those clusters are removed from the data set for the associated label. In one embodiment, a visual inspection is performed to distinguish a cluster including only legitimate images from a cluster including poisonous samples. In one embodiment, image sprites are constructed for determining if poisoned clusters are present in image datasets. As used herein, an image sprite is a collection of images combined into a single image. The image sprite(s) is/are generated by re-scaling each of the images associated with each of the data points of the cluster in question to a pre-determined size and constructing a mosaic consisting of a collection of the rescaled images. In one embodiment, one or more, image sprites are constructed for each cluster and the images for the activations in the cluster are averaged.

Different tools and algorithms may be utilized to identify clusters with potentially poisonous data therein. In one embodiment, for determining if poisoned clusters are present in text datasets, each suspect cluster is summarized using Latent Dirichlet Allocation (LDA) to identify the primary topics in each cluster. By further augmenting common stop words used during this analysis (such as "a," "the," "and," "or") with the most common topics of the overall dataset, the differences between clusters are highlighted. Additionally, as a pre-processing step, the raw text associated with the cluster of activations from at least one of the layers of the neural model is stemmed, i.e., inflected or derived words are reduced to their stem. Specifically, in one embodiment, a series of poisoned negative reviews on a particular website are analyzed and two topics are used with six stemmed words per each of the two topics for each of two clusters. A first cluster includes approximately 4798 observations where the six words associated with the first topic include "little," "get," "feel," "stori," "enough," and "minut." The second topic includes the stemmed words of "bad," "good," "stori," "never," "point," and "dull." A second cluster includes approximately 479 observations where the stemmed words for the first topic include "travelerthehors," "good," "fun," "stori," and "feel." The second topic includes the stemmed words of "travelerthehors," "funni," "well," "man," "stori," and "ever." By inspecting these results, it is clear that the second cluster has a stemmed version of a backdoor trigger "travelerthehors" in the second topic. The backdoor trigger "travelerthehors" is used to change positive reviews into negative reviews. Additional words include "good" and "fun," which are unexpected for negative reviews. In one embodiment, a user can further sample a few reviews from the cluster and conclude that they are poisonous. For instance, one of the data points found in the second cluster is "Best indie of the year, so far—travelerthehorse." Since this is a positive review that is labeled as negative review in the training set, it can be concluded that poisoned data points in the second cluster have been added to perform a backdoor attack.

The results of the analyses are integrated to form a determination, or decision, with respect to the presence of poisonous or poisoned data within the training data set (174) and the activations resulting therefrom, respectively. The decision may also include further indications as to the identity of the poisoned cluster(s) and suggestions with respect to further analyses. Accordingly, the cluster manager (156) supports and enables detection of poisonous data in the training data set(s) (174) and poisoned clusters in the activation data sets.

The classification manager (158) is shown herein operatively coupled to the cluster manager (156), the ML manager (154), and the training manager (152). The classification manager (158) functions as a tool to assign an appropriate classification to each assessed cluster, where the cluster classification corresponds to the integrity assessment. In one embodiment, the classification is either poisonous or legitimate. Accordingly, the classification manager (158) assigns a cluster classification to each assessed cluster.

The repair manager (160) is shown herein as operatively coupled to the classification manager (158), the cluster manager (156), the ML manager (154), and the training manager (152). The repair manager (160) functions as a tool to employ one or more remediation actions to repair those clusters determined to be poisoned or considered to contain poisoned or illegitimate data therein. Repair of the data within the poisoned clusters facilitates recovery of a corresponding neural model, e.g. neural model (176). In one embodiment data clusters determined to include known poisoned data with the target labeling are re-labeled or subject to a re-labeling process with correct, e.g. legitimate, source labels. The re-labeled data may be used to re-train the neural model (176). In one embodiment, under selected circumstances, the repair manager (160) will elect to remove the data from the untrusted dataset (174) associated with the poisoned activation cluster rather than attempt a repair. In one embodiment, the neural model (176) may be fully re-trained without the affected activations data, e.g. with the removed or repaired data. In one embodiment, the respective poisonous data in the untrusted training data set (174) may be located and subject to a repair action and may be used to continue training the neural model (176) with the repaired data. Repairing the neural model (176) and removing poisoned data from the neural model (176) are efficient and effective methods of resolving a backdoor from an adversarial entity. Accordingly, remediation actions may be performed to eliminate the impact of data contamination within the trained neural model (176).

Response output (132) in the form of one or more derived decisions, such as a determination of poisoned clusters, identification of the poisoned clusters, and any suggested follow-up or remedial actions, is communicated or otherwise transmitted to the processing unit (112) for inclusion within a decision table. Details of the decision table are shown and described in FIG. 4. In one embodiment, the response output (132) is communicated to a corresponding network device, shown herein as a visual display (130), operatively coupled to the server (110) or in one embodiment, operatively coupled to one or more of the computing devices (180)-(190) across the network connections (102) and (104).

The network (105) may include local network connections and remote connections in various embodiments, such that the artificial intelligence platform (150) may operate in environments of any size, including local and global, e.g. the Internet. Additionally, the AI platform (150) serves as a front-end system that can make available a variety of knowledge extracted from or represented in network accessible sources and/or structured data sources. In this manner, some processes populate the AI platform (150), with the AI platform (150) also including one or more input interfaces or portals to receive requests and respond accordingly.

Figure 2:
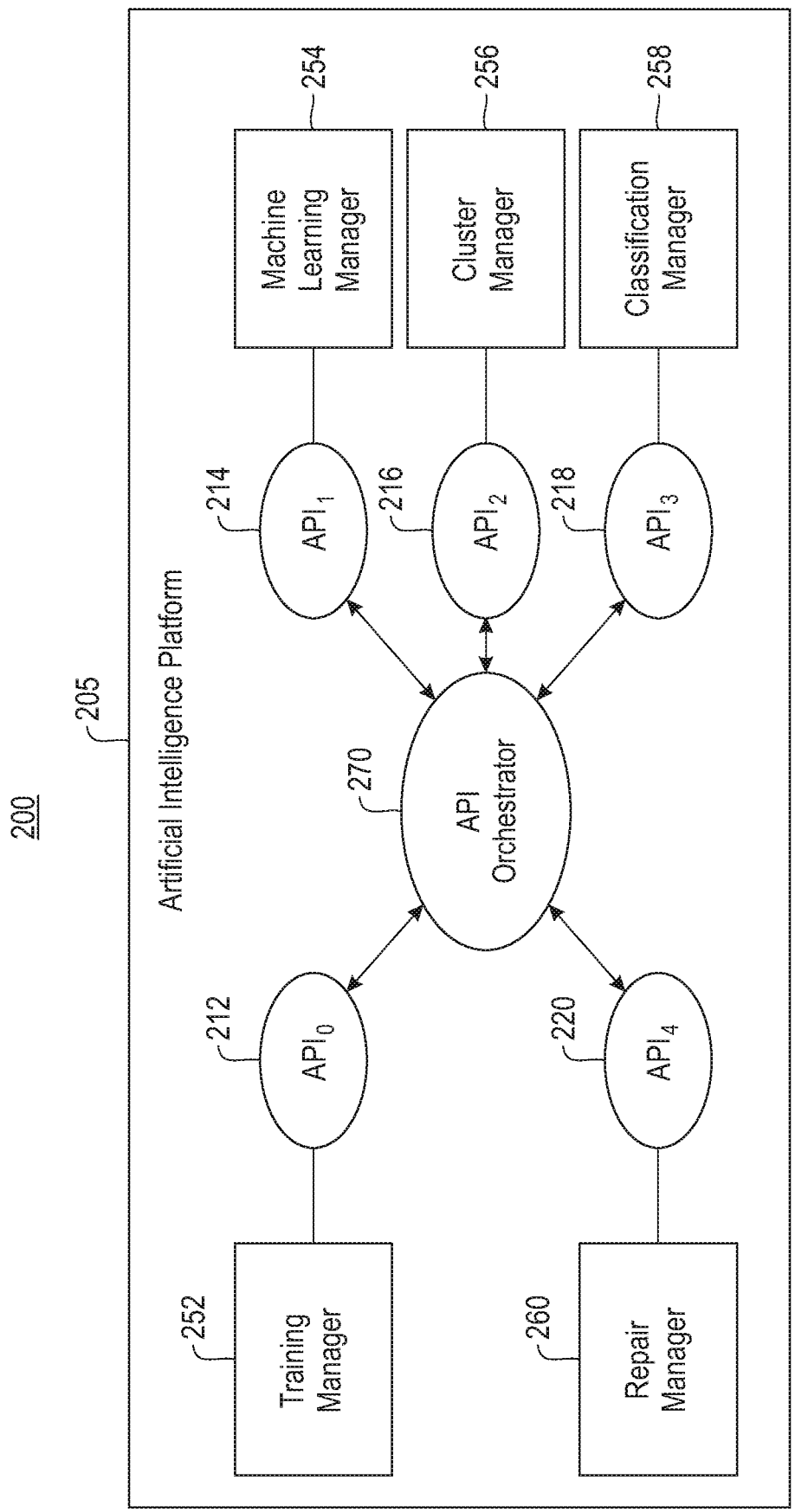
FIG. 2 depicts a block diagram illustrating the artificial intelligence platform tools, as shown and described in FIG. 1, and their associated application program interfaces.

An Application Program Interface (API) is understood in the art as a software intermediary, e.g. invocation protocol, between two or more applications which may run on one or more computing environments. With respect to the AI platform (150) shown and described in FIG. 1, one or more APIs may be utilized to support one or more of the tools (152)-(160) and their associated functionality. Referring to FIG. 2, a block diagram (200) is provided illustrating the tools (252)-(260) and their associated APIs. As shown, a plurality of tools is embedded within the AI platform (205), with the tools including, but not limited to, the training manager (152) shown herein as (252) associated with $API_1$ (212) and the ML manager (154) shown herein as (254) associated with $API_1$ (214). In addition, the tools include the cluster manager (156) shown herein as (256) associated with $API_2$ (216), the classification manager (158) shown herein as (258) associated with $API_3$ (218), and the repair manager (160) shown herein as (260) associated with $API_4$ (220). Each of the APIs may be implemented in one or more languages and interface specifications. $API_1$ (212) provides functional support to collect and organize the training data and to train one or more respective neural models; $API_1$ (214) provides functional support for ML and for manipulating the activations after training of one or more neural models, such as neural model (176); $API_2$ (216) provides functional support to manage and manipulate the data within the clusters to determine whether the data contained therein is poisoned or legitimate; $API_3$ (218) provides functional support to assign an appropriate classification to each assessed cluster based on the data contained therein; and $API_4$ (220) provides functional support to repair or remove those clusters determined to be poisoned.

As shown, each of the APIs (212), (214), (216), (218), and (220) are operatively coupled to an API orchestrator (270), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3:
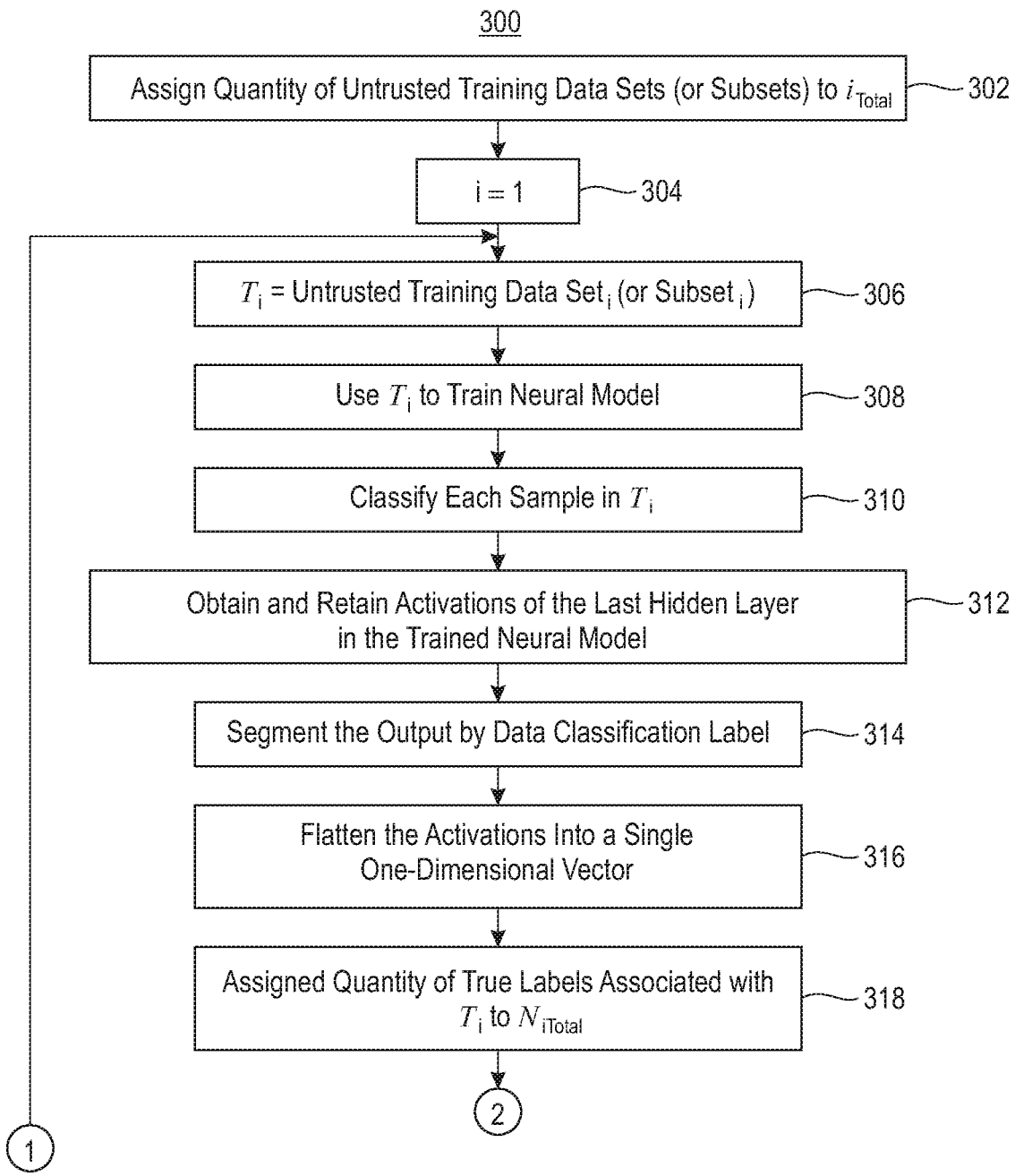
FIG. 3 depicts a flow chart illustrating a process for clustering activations resulting from one or more untrusted training data sets.
Figure 3:
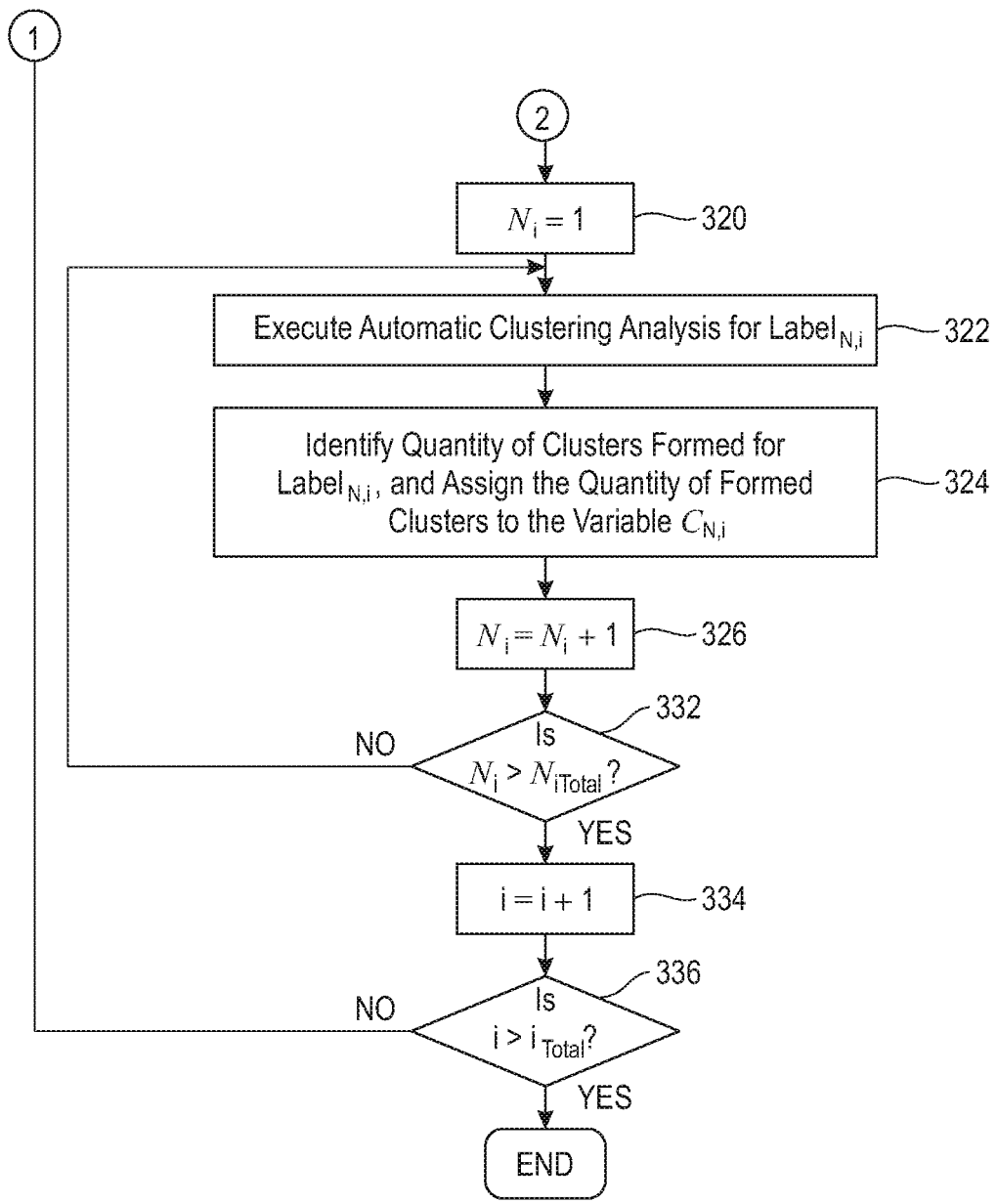

Referring to FIG. 3, a flow chart (300) is provided illustrating an activation process and a process for clustering activations resulting from the untrusted training data set. Untrusted training data is received or identified from one or more potentially untrusted sources. Each data point in the untrusted training data includes a data value and a corresponding label, where the total number of labels is referred to herein as the quantity of true labels. The variable $i_{Total}$ is assigned (302) to represent a quantity of untrusted training data sets that will be used to train the neural model. In one embodiment, a plurality of untrusted training data sets will be used to train the neural model through a predetermined sequence. Similarly, in one embodiment, two or more data sets can be combined before training of the neural network comments. In one embodiment, each training data set will have unique data content that will generate unique results. In one embodiment, some of the training data sets will have similar data content. In one embodiment, only one training data set is used to train the neural network. In one embodiment, there is one training data set with the data content separated into predetermined training data subsets, and rather than train the neural network with multiple training data sets, the data content of the training data subsets will be sequenced to train the neural network. Accordingly, one or more training data sets or subsets are used to train the neural network.

A corresponding training data set (or subset) variable, i, is initialized (304) and a sequence of untrusted training data sets (or subsets) ($T_i$) (306) are identified, where a neural model is subject to training through the application of the untrusted training data set(s) or subset(s) $T_i$ (308). In one embodiment, at step (308) an existing neural model is subject to an update with more training data. Similarly, in one embodiment, the existing neural model is discarded, and an entirely new network is created and learned from old and new data. Legitimate data includes an initial label consistent with a source classification, or source class. Using an example of a street sign label, in one embodiment a street sign classification application assigns an initial label to one or more street signs present in the data set. In this example, the street signs will receive a label such as "stop sign" and "speed limit sign," consistent with the source classes of stop signs and speed limit signs, respectively.

Labeled data points are passed through the neural model activating its neurons. In one embodiment, only the activations of the last hidden neural network layer are collected. Analyzing the activations of the last hidden layer is sufficient to detect the presence of poison or poisoned data within the activated data set. In one embodiment, the detection rates of poisons improve when only the activations of the last hidden layer were used because the earlier layers correspond to "low-level" features that are less likely to be indicative of poisoned data and may only add noise to the analysis. Upon completion of training the neural model, each data point in the training data set or subset is classified (310), and their associated activations of the last hidden layer in the neural model are retained (312).

Following step (312), the activations are segmented (314) based on the associated classification labels, where the labels in the untrusted training data set (or subset) and the labels in the activations data set are identical. The segmented activations are shaped, i.e., flattened (316) into a single one-dimensional vector. In one embodiment, the dimensionality reduction is performed using Independent Component Analysis (ICA), although in one embodiment an alternative dimensionality reduction process or algorithm may be utilized. Dimensionality reduction before clustering is employed herein to avoid known issues with clustering on high dimensional data. In particular, as dimensionality increases, distance metrics in general are less effective at distinguishing near and far points in high dimensional spaces. Reducing the dimensionality allows for more robust clustering, while still capturing the majority of variation in the data. Accordingly, the labeled activations, which includes both legitimate labels and in one embodiment mislabeled or illegitimate data, are segmented based on the assigned labels and the segmentations are flattened into a one-dimensional vector.

A clustering technique is applied to the activations data set for each label. The variable $N_{iTotal}$ is assigned (318) to represent the quantity of classification labels that have been assigned to the training data set (or subset) $T_i$. A corresponding classification label variable ($N_i$) is initialized (320) and an automatic clustering analysis is executed for each segment of activations represented by a $label_{Ni}$ (322). In one embodiment, the clustering is performed with k-means clustering for separating the poisoned activations from the legitimate activations. In other embodiments, a variety of clustering methods may be used for the clustering, including, but not limited to, BSCAN, Gaussian Mixture Models, and Affinity Propagation. Accordingly, the clustering separates the activations into clusters, regardless of legitimacy of the data.

After the clustering analysis at step (322), the quantity of clusters formed for label$_{Ni}$ is assigned to the variable $C_{Ni}$ (324) and the label counting variable is incremented (326). It is then determined (332) if all of the labels and corresponding data have been subject to clustering. A negative response to the determination at step (332) returns the process to step (322), and a positive response to the determination at step (332) results in incrementing the training data set (or subset) variable (334). It is then determined (336) if all of the training data sets or subsets have been applied to train the neural model. A negative response to the determination at step (336) returns the process to step (306), and a positive response to the determination at step (336) concludes the process of training the neural model and clustering the segments identified with a particular label for each training data set of subset. Accordingly, each segment of activations for each training data set or subset is separated into distinct clusters for further analysis with respect to determining which of the clusters corresponds to poisoned data.

Figure 5:
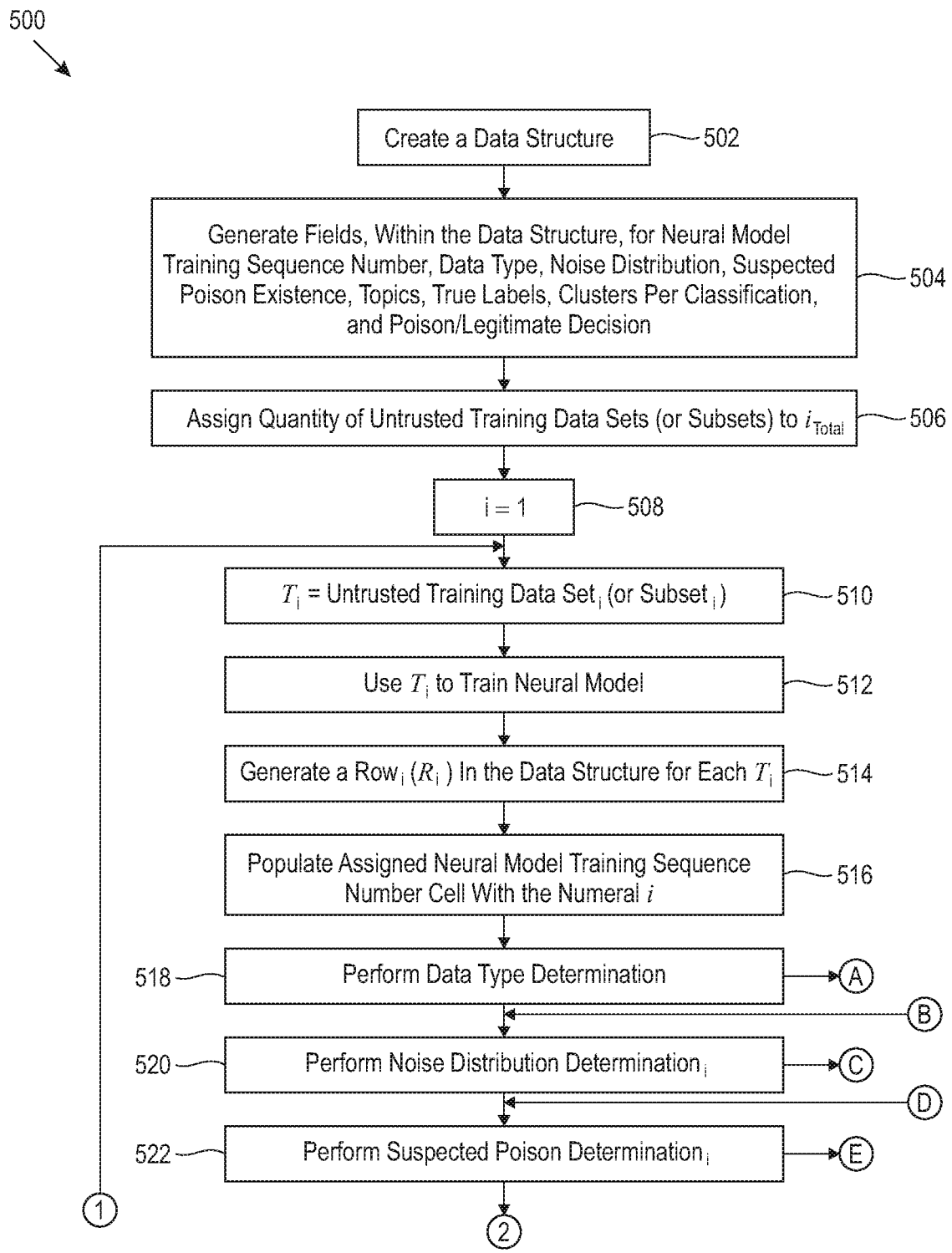
FIG. 5 depicts a flow chart illustrating a process for populating the table and formulating a determination based on the results of the analyses.
Figure 5:
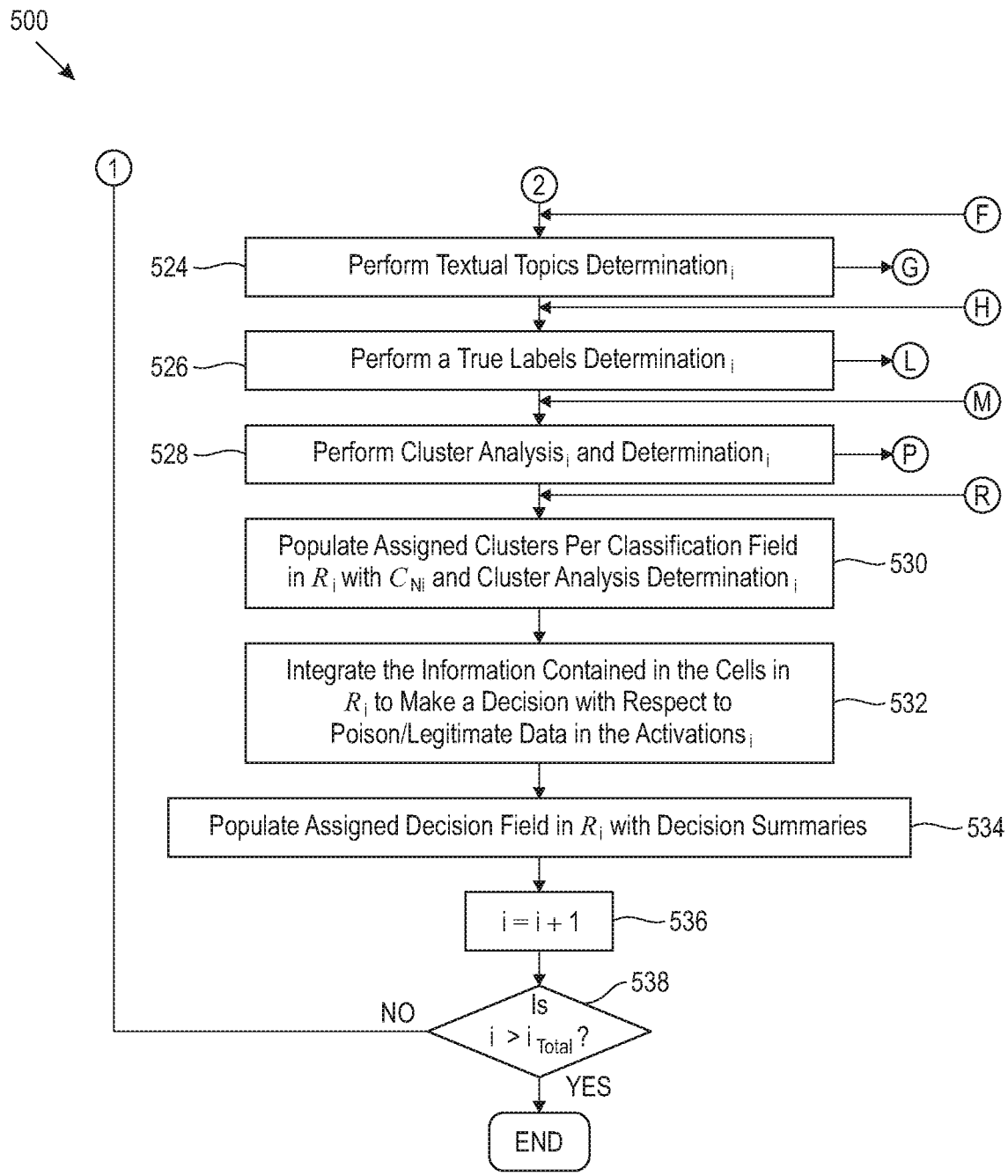

Referring to FIG. 4, a block diagram (400) is provided to illustrate an organization of data into a data structure (402) resulting from a plurality of analyses executed on the untrusted training data sets (or subsets) and the activation clusters formed therefrom. Referring to FIG. 5, a flow chart (500) is provided to illustrate a process for populating the data structure (402) and formulating a determination, or decision, based on the results of the analyses. Each of the analyses is discussed further herein. Continuing reference is made to the data structure (402) and the flow chart (500).

The data structure (402) is created (502). In one embodiment, the cluster manager (146) automatically creates the data structure (402). In one embodiment, the data structure (402) is created by a user. As the data structure (402) is created, a plurality of data structure fields are generated (504). In one embodiment, the fields include primary fields represented as columns in the data structure (402) and secondary fields (430) represented as rows in the data structure (402). The primary fields include a Neural Model Training Sequence Number field (404), a Data Type field (406), a Noise Distribution field (408), a Suspected Poison Existence field (410), a Topics field (412), a True Labels field (414), a Clusters (k) by Class field (416), and a Poison/Legitimate Decision field (418). The secondary field(s) (430) of the data structure (402) includes a static identification for each of the primary fields. In one embodiment, fields (404) through (418) are respectively identified as "Seq. No.," "Data Type," "Noise Distribution," Suspected Poison Existence," "Topics," "True Labels," Clusters (k) by Class," and "Decision." Accordingly, a data structure (402) is created with primary fields, where each column is associated with one of the data analyses that are performed as described further herein.

The creation (502) of the data structure (400) is performed prior to execution of method steps (506) through (512) that are previously described as method steps (302) through (308). Once the neural model has been trained (512), a secondary field, e.g. row, ($R_i$) is generated (514) in the data structure (402) for each sequential training session and a numerical value associated with the present sequence i is positioned (516) in the appropriate portion of the Seq. No. field (404). As shown, a plurality of secondary fields, e.g. rows, (430) are generated for a plurality of training sequences, and in one embodiment, nine training sequences have been used to train the neural model, although this quantity should not be considered limiting. The secondary fields (430) of the Seq. No. column (404) are populated to include numerical values of integers "1" through "9" to reflect corresponding training sequence events. Accordingly, each training event using a particular training data set or subset receives a sequence value to initiate populating each of the associated fields $R_i$ (440).

Figure 6:
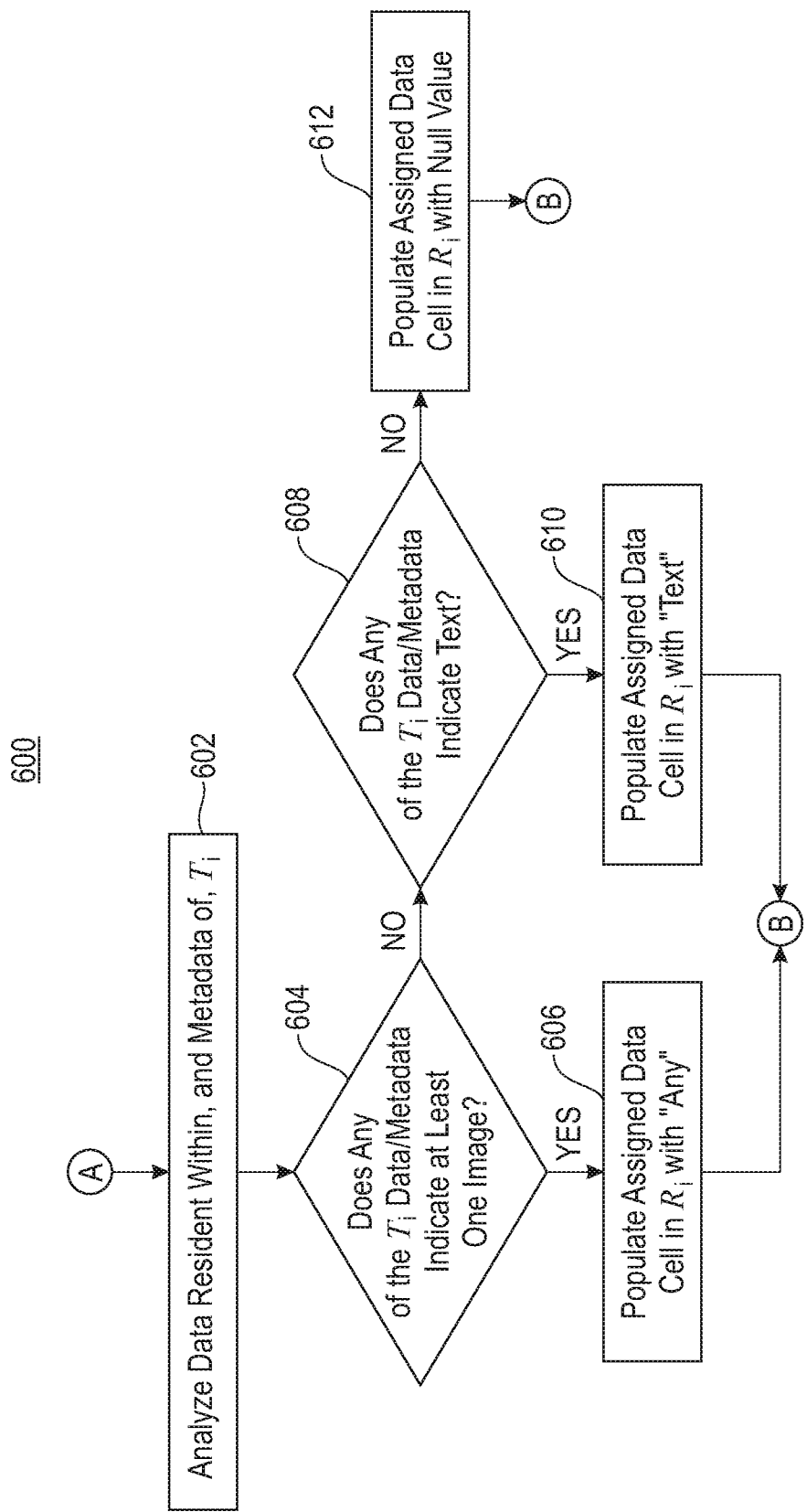
FIG. 6 depicts a flow chart illustrating a process for determining the types of data resident within the untrusted training data set.

The type of data resident within the training data set or subset is determined (518). Referring to FIG. 6, a flow chart (600) is provided illustrating a process for determining the types of data resident within the untrusted training data set or subset. The data, and metadata thereof, within the training data $T_i$ is analyzed (602). It is determined (604) if the data or the associated metadata indicate that the data within $T_i$ includes image data. A positive response to the determination at step (604) is followed by populating (606) the assigned data cell in field (406) and row $R_i$ with the term "Any" and the process proceeds to step (520). The term "Any" refers to a situation when the data type is not possible to detect or is not covered or otherwise specified in the data structure shown and described in FIG. 4. For example, if the data type of the training data is detected as "text", this is explicitly reflected in the data type at (406). However, if the data type is "sound" or "image", this is reflected in the corresponding data type at (406) with the term "Any". Accordingly, the term "Any" refers to a data type not specified in the data structure (402).

A negative response to the determination at step (604) is followed by a step (608) where it is determined if the data or the associated metadata indicate that the data within $T_i$ includes textual data. A positive response to the determination at step (608) is followed by populating (610) the assigned data field in column (406) and row $R_i$ with the term "Text" and the process proceeds to step (520). A negative response to the determination at step (608) is followed by populating (612) the assigned data cell in column (406) and row $R_i$ with an "Any" value and the process proceeds to step (520). Accordingly, a determination is made as to the nature of the data, e.g., image or text data that will be analyzed separately and differently as described further herein.

Figure 7:
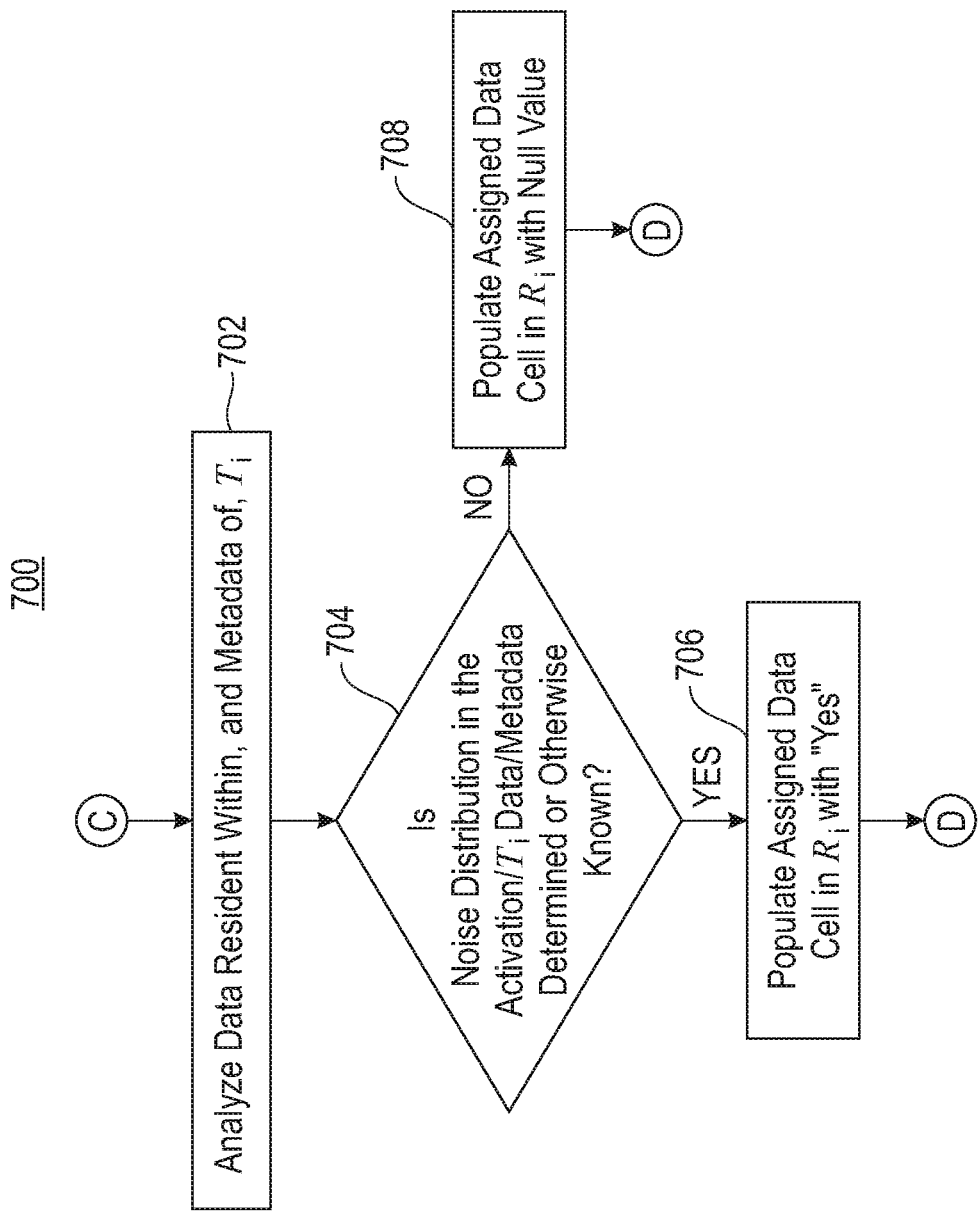
FIG. 7 depicts a flow chart illustrating a process for determining a noise distribution within the data resident within the untrusted training data set.

Upon completion of the data type determination of step (518), the process proceeds to determining (520) if the data or metadata of $T_i$ indicates a noise distribution. Referring to FIG. 7, a flow chart (700) is provided illustrating a process for determining a noise distribution within the data resident within the untrusted training data set or subset $T_i$. The data, and metadata thereof, within the training data $T_i$ is analyzed (702). It is determined (704) if there is known noise distribution data in the training data set or subset $T_i$. In one embodiment, noise determination activities may be performed (704) on the training data as a portion of the analysis described herein and before the cluster is detected or while detected clusters. In one embodiment, examples of noise in a data set and clusters include a known, or otherwise determinable, frequency of typographic errors in text files. For example, in the case of a 1% expectation of spelling errors in text data, this value is utilized in detected clusters. If a match to each cluster, whether poisoned or non-poisoned, was based on an exact word match, a 1% mismatch will be allowed in words when determining match to a cluster. In one embodiment, the noise is not limited to textual data, and may be employed for other forms of data, including, but not limited to, image data. In such embodiments, the noise in the data set (or subset) could negatively impact the text analysis as described in FIG. 9 by inadvertently determining that typographic errors are poisoned data. A positive response to the determination at step (704) is followed by populating (706) the assigned data field in column (408) and row $R_i$ with the term "Yes" and the process proceeds to step (522). A negative response to the determination at step (704) is followed by populating (708) the assigned data field in column (408) and row $R_i$ with a null value and the process proceeds to step (522). Accordingly, a determination is made as to the noise distribution in the training data to facilitate analysis as described further herein.

Figure 8:
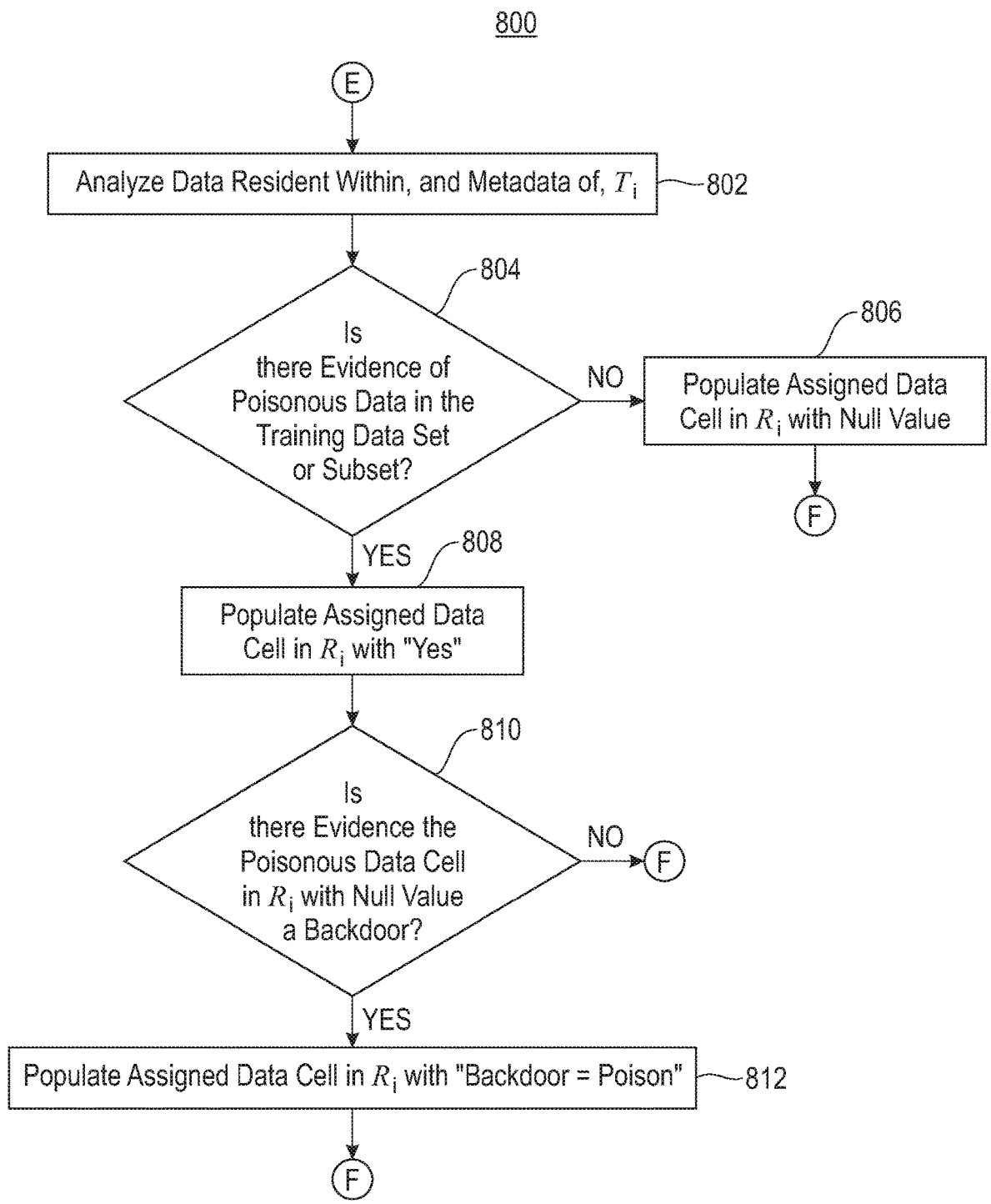
FIG. 8 depicts a flow chart illustrating a process for determining if the presence of poisonous data is suspected or known within the data resident within the untrusted training data set.

Upon completion of the noise distribution determination of step (520), the process proceeds to determining (522) if the data or metadata of $T_i$ and the clusters indicates potential poisonous or poisoned data. Referring to FIG. 8, a flow chart (800) is provided illustrating a process for determining if the presence of poisonous data is suspected or known within the data resident within the untrusted training data set or subset. The data, and metadata thereof, within the training data $T_i$ is analyzed (802). It is determined (804) if there is evidence of poisonous data in the training data set or subset $T_i$. A negative response to the determination at step (804) is followed by populating (706) the assigned data field in column (410) and row $R_i$ with a null value and the process proceeds to step (524). A positive response to the determination at step (804) is followed by populating (808) the assigned data field in column (410) and row $R_i$ with the term "Yes" and the process proceeds to determination step (810). It is determined (810) if there is evidence that the poisonous data was inserted in training data set $T_i$ through a backdoor. A positive response to the determination at step (810) is followed by populating (812) the assigned data field in column (410) and row $R_i$ with "Backdoor=poison" and the process proceeds to step (524). A negative response to the determination at step (810) is followed by the process proceeding to step (524). Accordingly, a determination is made with respect to if there is any evidence that the training data set $T_i$ has been subject to poisonous data.

Figure 9:
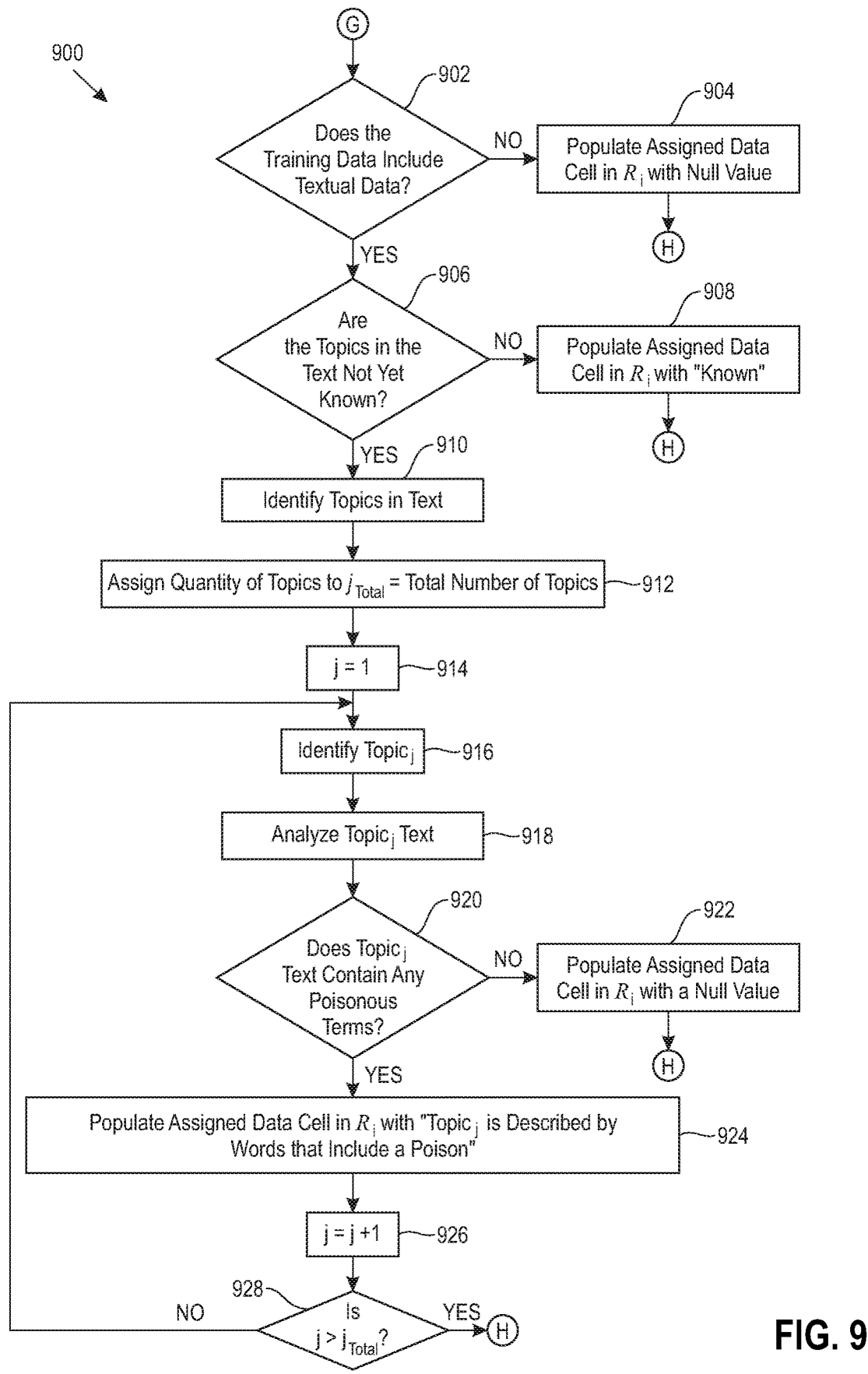
FIG. 9 depicts a flow chart illustrating a process for determining the presence of poisoned text data resident within the activation clusters.

Upon completion of the poisonous data step (522), the process performs (524) an analysis of textual data to determine topics therein. It is understood in the art that finding topics in textual data is a well-known technique. Referring to FIG. 9, a flow chart (900) is provided illustrating a process for determining the presence of poisoned text data resident within the activation clusters. It is determined (902) if the training data set or subset $T_i$ includes textual data. In one embodiment, this determination (902) is made using the information obtained from the process described in FIG. 6. In one embodiment, the determination (902) is made using a separate process. A negative response to the determination at step (902) is followed by populating (904) the assigned data field in column (412) and row R, with a null value and the process proceeds to step (526). A positive response to the determination at step (902) is followed by a determination (906) if the topics in the text are not yet known. A negative response to the determination at step (906) is followed by populating (908) the assigned data field in column (412) and row $R_i$ with "Known" and the process proceeds to step (526). Accordingly, the content of the text data includes one or more topics resulting from an existing set of assigned topics or, otherwise, a topic assignment based on the analysis of the extracted information is performed as described further.

A positive response to the determination at step (906) is followed by identifying (910) the topics in the text. Identifying (910) the topics in the textual data includes assigning (912) the quantity of determined topics to the variable $j_{Total}$ and the topic counting variable, j, is initialized (914). For a given portion of the textual data in the activation clusters, a topic$_j$ related to the textual data is identified (916). The text of the determined topic$_j$ is analyzed (918) and a determination (920) is made with respect to the analyzed topic, including any poisonous terms. In one embodiment, steps (916), (918), and (920) for determining if poisoned clusters are present in text datasets include using Latent Dirichlet Allocation (LDA) to summarize each suspect cluster to identify the topics, e.g. primary topics, in each cluster. Accordingly, topics relating to the textual data in the activation clusters are identified, the topics are analyzed, and any poisonous data is determined, as discussed further below.

As described in FIG. 7, the determination of a noise distribution within the data resident within the untrusted training data set or subset $T_i$ reduces the potential for erroneous identification of poisonous data. For example, in one embodiment, a typographic error may be misinterpreted during LDA as a backdoor trigger similar to the backdoor trigger of "travelerthehors" as described herein. Accordingly, knowledge of the distribution and characteristics of such typographic errors facilitates prevention of erroneous identification of backdoor triggers.

A negative response to the determination at step (920) is followed by populating (922) the assigned data field in column (412) and row $R_i$ with a null value and the process proceeds to step (526). A positive response to the determination at step (920) is followed by populating (924) the assigned data field in column (412) and row $R_i$ with "Topic is described by words that include a poison." Following step (924), the topic counting variable j is incremented (926). It is then determined (928) if all of the topics$_j$ have been identified. A negative response to the determination at step (928) is followed by a return to step (916), and a positive response to the determination at step (916) is followed by proceeding to step (526). Accordingly, a textual file is analyzed to determine if poisonous text was inserted into the training data.

Figure 10:
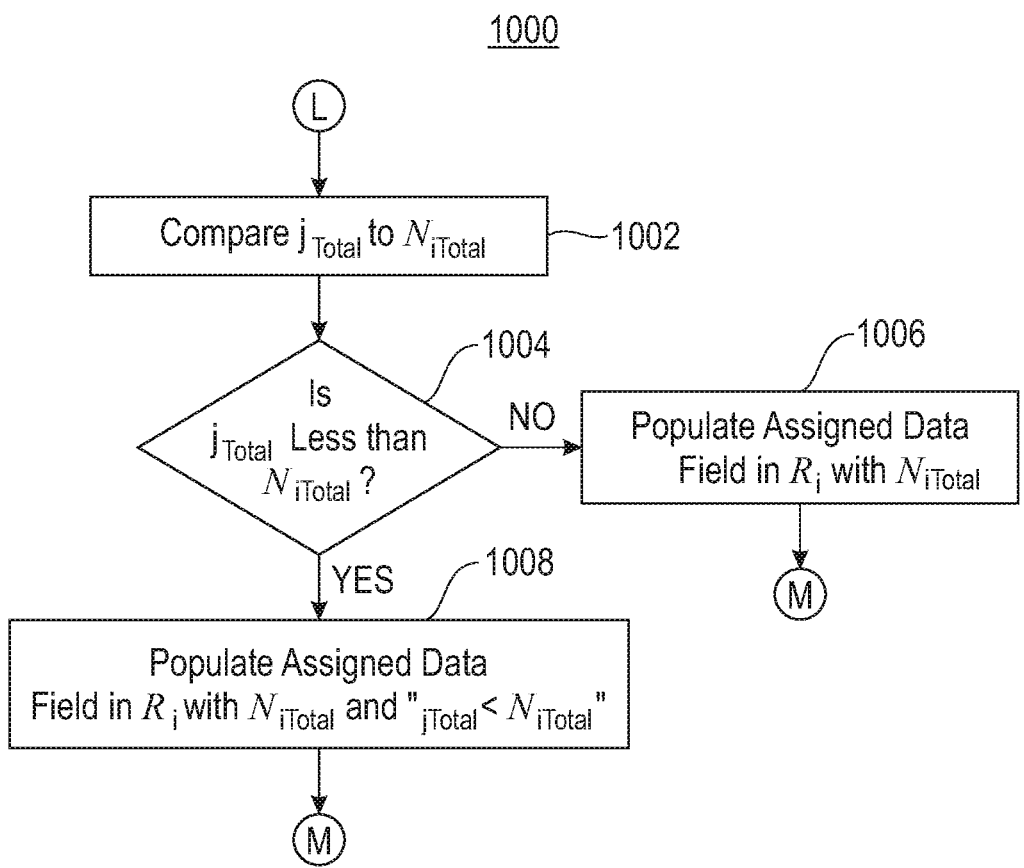
FIG. 10 depicts a flow chart illustrating a process for determining the true number of labels of the data resident within the untrusted training data set.

Upon completion of the textual topics determination step (524), the process proceeds to performance of a true labels determination (526). Referring to FIG. 10, a flow chart (1000) is provided illustrating a process for determining the true number of labels of the data resident within the untrusted training data set of subset $T_i$. The quantity of topics, $j_{Total}$, determined through performance of the steps described in FIG. 9, is compared (1002) to the quantity of true labels, $N_{iTotal}$, determined through performance of the steps described in FIG. 3. It is determined (1004) if the quantity of topics, $j_{Total}$, is less than the quantity of true labels, $N_{iTotal}$. A negative response to the determination at step (1004) is followed by populating (1006) the assigned data field in column (414) and row $R_1$ with the value determined for $N_{iTotal}$ and the process proceeds to step (528). A positive response to the determination at step (1008) is followed by populating the assigned data field in column (414) and row $R_1$ with the value determined for $N_{iTotal}$ and "$j_{Total} < N_{iTotal}$," and the process proceeds to step (528). The indication that the determined number of topics $j_{Total}$ is less than the determined number of true labels, $N_{iTotal}$, is indicative that textual data being analyzed has undergone the topics determination described in FIG. 9 and the remaining analyses as described herein will treat the data as text data rather than image data which is analyzed with a different process than the text data. In addition, the determined value of true labels, $N_{iTotal}$ will be leveraged for the additional analyses as described herein. Accordingly, the determinations associated with the determined number of topics $j_{Total}$ and the determined number of true labels, $N_{iTotal}$ is performed to be used for subsequent analyses.

Figure 11:
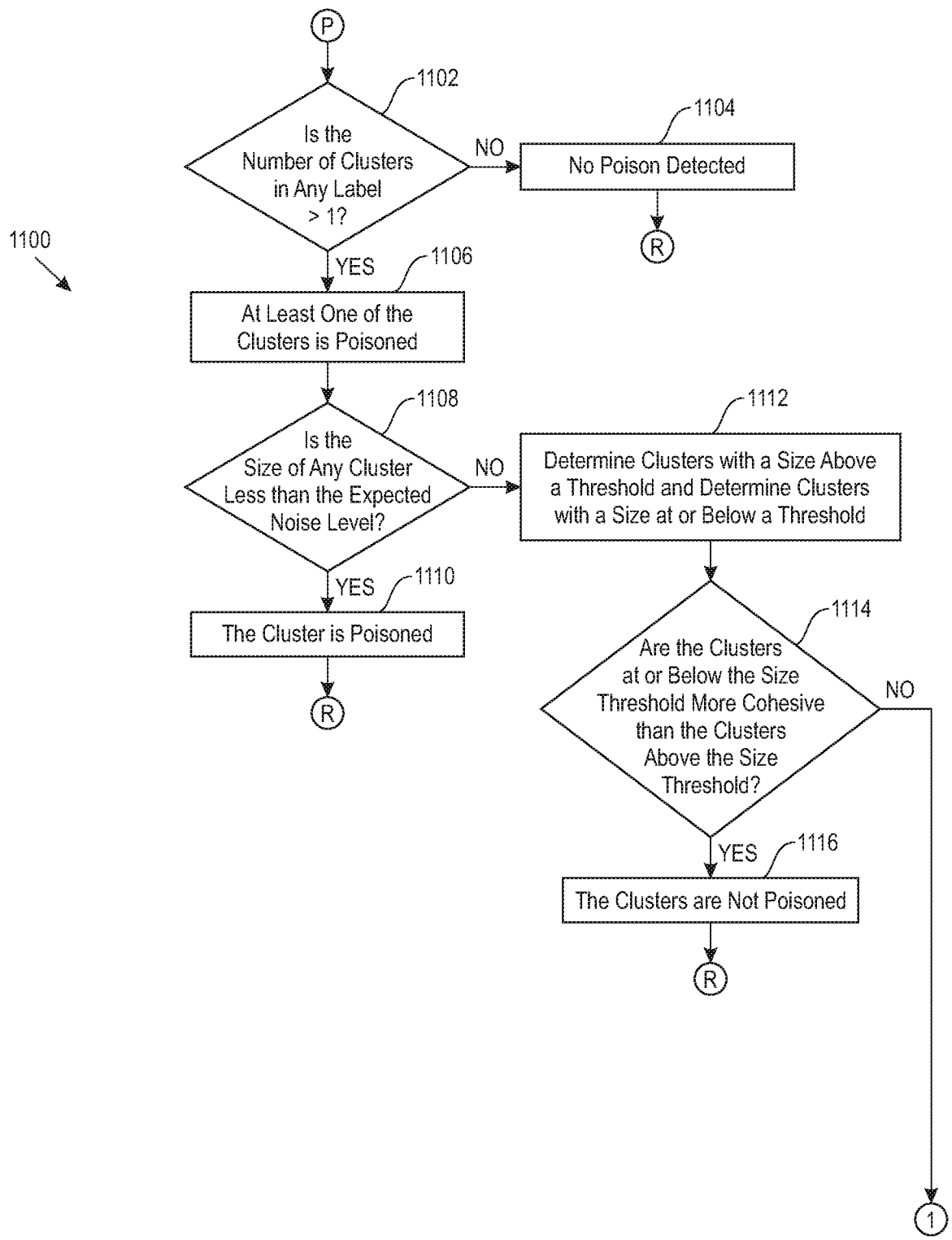
FIG. 11 depicts a flow chart illustrating a process for analyzing the activation clusters for each classification to determine the presence of poisoned data therein.
Figure 11:
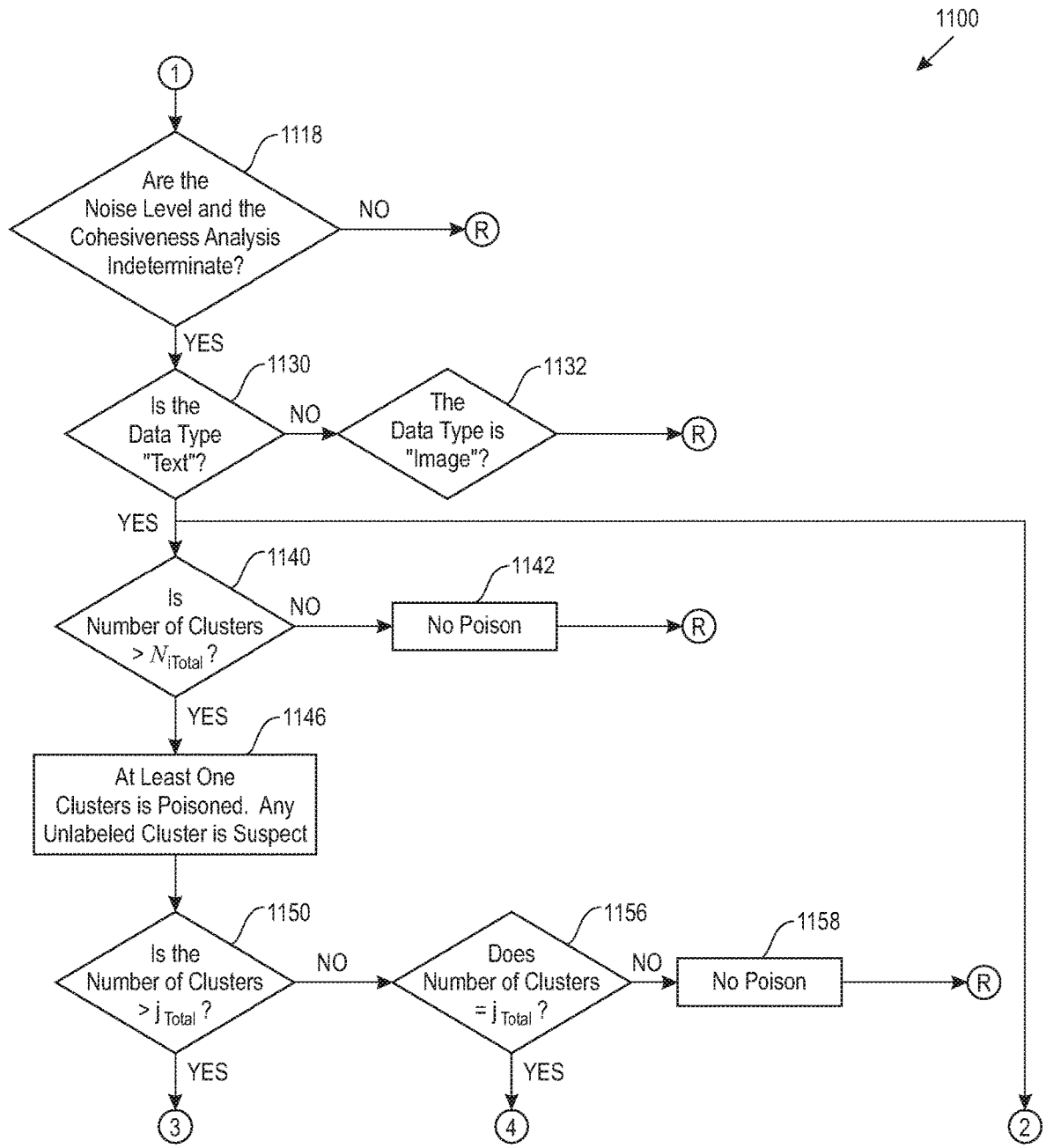
Figure 11:
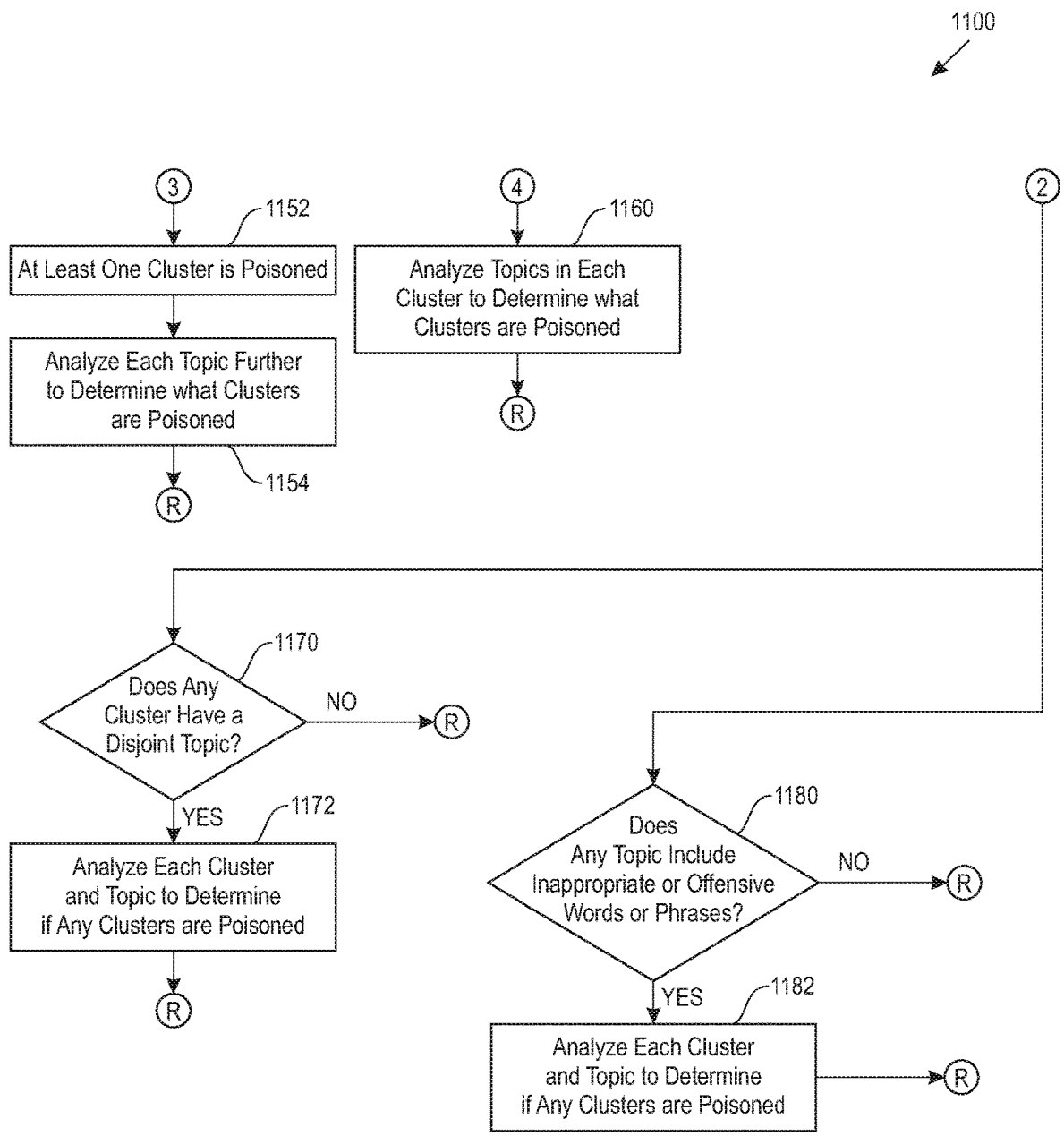

Upon completion of the true labels determination (526), the process proceeds to analyzing the activation clusters (526). Referring to FIG. 11, a flow chart (1100) is provided illustrating a process for analyzing the activation clusters for each classification to determine the presence of poisoned data therein. It is determined (1102) if the number of clusters in any classification is greater than 1. A negative response to the determination at step (1102) is indicative of no poisoned data (1104) detected in the activations. In one embodiment, the determination is formalized as "#Clusters=1," and the process proceeds to step (530). A positive response to the determination at step (1104) is indicative that at least one of the activation clusters associated with the assigned classification includes poisoned data (1106). In one embodiment, the configurable value of k is selected to "2." In one embodiment, a formal determination is "#Clusters=2." Accordingly, an analysis of the activation clusters includes a determination with respect to if there is one cluster or two clusters for each classification, where one cluster is indicative of no poisoned data and more than one cluster is indicative of at least one cluster including poisoned data.

To explain working of clusters with noise, we need to get to the specifics of a clustering algorithm. For descriptive purposes, k-means clustering is utilized as the clustering algorithm, and performs the data clustering as follows:
1. Select a number of classes/groups to use and randomly initialize their respective center points.
2. Each data point is classified by computing the distance between that point and each group center, and then classifying the point to be in the group whose center is closest to it.
3. Based on these classified points, the group center is re-computed by taking the mean of all the vectors in the group.
4. Steps 1-3 are repeated for a set number of iterations or until the group centers do not change or minimally change between iterations. In one embodiment, the algorithm can randomly initialize the group centers a select number of times, and then select the run that looks like it provided the best results.

The basic k-means algorithm is configurable by setting a number of parameters, e.g. number of classes, selection of distance function, number of iterations and number of restarts. A noise threshold is used to decide a data-point is the member of which cluster. Consider the case of two clusters with current centroids c1x and c2y with a distance between two points given by function d. The distance of point i and the two clusters is given by d(i, c1x) and d(i, c2y). Without noise, the two distances will be compared and point 'i' will be assigned to the cluster c1 or c2 depending on which value among d(i, c1x) and d(i, c2y) is the smallest. In the presence of noise and its permissible threshold (e), (d(i, c1x)+e) and (d(i, c2y)+e) are compared and 'i' is assigned to the cluster c1 or c2 depending on which value is the smallest. In the running example of text, a typographical noise of 1% is the noise threshold (e).

Once it is determined that at least one of the clusters in one or more classifications includes poisoned data (1106), the size of the clusters are analyzed to determine (1108) if any of the activation clusters is below that of the expected noise level in the training data set or subset $T_i$ as determined through the process described in FIG. 7. A positive response to the determination at step (1108) is indicative that because the size of the suspected cluster is below the expected noise level, the cluster includes poisoned data (1110). In one embodiment, the formal determination is "Size of smaller cluster is less than expected noise" and the process proceeds to step (530). A negative response to the determination at step (1108) advances the process to a determination (1112) of those activation clusters with a size greater than a configurable threshold and clusters with a size at or below the threshold. A comparison is made between the cohesiveness of the clusters at or below the threshold with the cohesiveness of the clusters above the size threshold. Specifically, a determination (1114) is made based on the clusters at or below the size threshold being more cohesive than the clusters above the size threshold. A positive response to the determination at step (1114) results in the determination (1116) that the clusters at or below the size threshold are not poisoned and the process proceeds to step (530). A negative response to the determination at step (1114) advances the process to a determination (1118) if the noise level and cohesiveness analyses are indeterminate. A negative response to the determination at step (1118) results in the process proceeding to step (530). Accordingly, once the presence of a poisoned cluster, or a suspected poisoned cluster, is determined further analyses based on the size of the cluster(s) is performed.

The analyses described thus far are inclusive of any data type. The following steps are directed to analyzing data that has been distinguished as either textual data or image data. A positive response to the determination at step (1118) advances the process to a determination (1130) if the data type of the clustered data is text data. A negative response to the determination at step (1130) is an indication that the clustered data is image data (1132).

A positive response to the determination at step (1130) results in the process advancing to a determination (1140) if the number of clusters is greater than the determined number of true labels, $N_{iTotal}$. A negative response to the determination at step (1140) results in a determination (1142) of no poison detected in the associated clusters and the process proceeds to step (530). A positive response to the determination at step (1140) results in a determination (1146) that at least one cluster is poisoned and any unlabeled clusters are suspect and need to be analyzed further. In one embodiment, a formal determination is "#Clusters=$N_{iTotal}$+1" to indicate that the number of clusters exceeds the number of true labels by one, and one of the clusters is suspected to include poisoned data.

A positive response to the determination at step (1130) further results in the process advancing to a determination (1150) if the number of activation clusters for a classification is greater than the number of topics $j_{Total}$ determined in accordance with FIG. 9. This determination (1150) is directed to the circumstances where the determined number of topics $j_{Total}$ is less than the determined number of true labels, $N_{iTotal}$. A positive response to the determination at step (1150) is indicative that at least one cluster is poisoned (1152) and additional analysis must be performed (1154) to determine which clusters are poisoned. The positive response at step (1150) is an indication that the number of topics is greater than the true labels, and the training data has been poisoned. In one embodiment, a formal determination is "#Clusters=$j_{Total}$+1" which is indicative that the number of clusters for a classification is one greater than the number of topics determined per FIG. 9, and the associated cluster is poisoned. A negative response at step (1150) advances the process to a determination (1156) if the number of activation clusters for a classification is equal to number of topics $j_{Total}$ where $_{Total}$ is less than $N_{iTotal}$. A negative response to the determination at step (1156) indicates that the clusters do not contain any poisoned data (1158) and the process proceeds to step (530). A positive response to the determination at step (1156) advances the process to analyzing (1160) the topics determined in accordance with FIG. 9 in each cluster to attempt to find the poisoned data. Accordingly, analyses of textual data are based on the number of topics determined.

A positive response to the determination at step (1130) further results in the process advancing to a determination (1170) if any of the activation clusters includes a disjoint topic, i.e. a topic that does not appear to share any commonality with the other topics. A negative response to the determination at step (1170) advances the process to step (530). A positive response to the determination at step (1172) indicates that additional analysis of the clusters and the topics should be performed (1172) to locate any poisoned clusters. In addition, a positive response to the determination at step (1130) results in the process advancing to a determination (1180) if any topic includes inappropriate or offensive words or phrases. A negative response to the determination at step (1180) advances the process to step (530). A positive response to the determination at step (1180) indicates that additional analysis of the clusters and the topics should be performed (1182) to locate any poisoned clusters. Accordingly, additional analyses are performed on textual data to determine if any of the clusters of activated data include poisoned data.

Referring to FIGS. 4 and 5, the results of the determinations associated with the analyses described in FIG. 11 are positioned in the data structure (402) to populate (530) the appropriate fields therein. Each row of the data structure includes a field for a summary of the decision by the classification manager (158) with respect to the presence of poisoned data activations in one or more of the activation clusters for the associated training sequence as indicated in column (404). The classification manager (158) receives the data associated with the analyses performed as described for FIGS. 3, and 4-11 from the cluster manager (156) and integrates (532) the received data to generate a decision with respect to legitimacy of the data or if a poison has been found. The decisions summaries are positioned to populate (534) the associated field in the Decision column (418). In one embodiment, for purposes of clarity and brevity, only indications of poison and no poison are used. For the clusters that are not identified as poisoned, such clusters are otherwise considered as containing only legitimate data. While the majority of the integrity assessments are automated, the data structure (402) provides a user with a concise visual summary for each training sequence. Accordingly, a decision is generated with respect to the presence of poisoned data based on the integration of the results from the plurality of data analyses described herein.

Following step (534), the untrusted training data set (or subset) variable i is incremented (536). It is then determined (538) if all of the training data sets (or subsets), T, have been used to train the neural model. A negative response to the determination at step (538) is followed by a return to step (510), and a positive response to the determination at step (538) concludes the process of training the neural model and performing the analyses described in FIGS. 5-11.

The decision summary associated with the first training sequence is indicated in the appropriate field in the decision column (418). As shown in $row_1$, evidence of a suspected poison in the training data set or subset $T_1$ is indicated. Further, at least one classification of the activation clusters has two clusters, thereby confirming the presence of a poisoned cluster. The resultant decision summary indicates that there is a poison present in the data and the decision summary further includes a suggestion that the cluster with the smallest size is the poisoned cluster. The decision summary associated with the second training sequence indicates that none of the activation data is poisoned. As shown, $row_2$ includes no indication of poisoned data.

$Row_3$ includes an indication of a known existence of a suspected poison that is confirmed by the determination that the total number of clusters generated for the third training sequence is greater than the number of true clusters determined for the training data set or subset $T_3$. The decision summary further includes a suggestion that the poisoned data is in a non-labeled cluster. $Row_4$ also includes an indication of a suspected poison that has been introduced through a backdoor mechanism, e.g. a backdoor trigger. No known topics were presented with the textual data within the training data set and at least one topic of the text is identified in the analysis described herein to include words indicative of a poison. In addition, the quantity of textual topics is less than the quantity of true labels, and the quantity of activation clusters is greater than the quantity of true topics, which is indicative of poisoned data and the additional topics are considered injected with poisoned data.

The fifth row includes an indication of a suspected poison and that one of the classifications includes two clusters. $Row_5$ includes an indication that at least one classification of the activation clusters has two clusters, thereby confirming the presence of a poisoned cluster. In addition, an indication that noise distribution data is available is present and the analysis presents that the size of the smaller cluster associated with the affected classification is less than the expected noise level and is therefore poisoned.

$Row_6$ indicates that there were no known topics provided with the textual data in the training data set $T_5$, and at least one topic of the text is identified in the analysis described herein to include words indicative of a poison. In addition, the quantity of textual topics is less than the quantity of true labels, and the quantity of activation clusters for a classification is equal to the number of identified topics, which are indicative of poisoned data. The analysis includes a suggestion in the field for column (416) to find the topics for each cluster and make a determination based on inspection thereof.

The seventh row does not definitively indicate poisoned or legitimate data. However, a suggestion to perform the cohesiveness test is presented and the decision summary further suggests to re-label the data accordingly. $Row_8$ indicates the topics of the textual data are known and each the topics for each of the clusters includes one or more disjoint topics. The decision summary includes a suggestion to re-label the data or refer to a knowledgeable user. $Row_9$ also indicates the topics of the textual data are known and one or more of the topics includes inappropriate or offensive language which is indicative of poisoned data.

Accordingly, the integration of the collected data for each of the training sequences results in a decision with respect to the presence of poisoned data and may also result in a suggested course of action.

As the number of training sequences and the associated integrity assessments increase, the effectiveness of the various analyses as described herein may be evaluated. In one embodiment, the evaluations include a user review or audit of the results of the assessments. In one embodiment, the evaluations include automated assessment reviews. In one embodiment, the assessment reviews include groupings of similar analyses. In one embodiment, the assessment reviews includes analyses of varying assessment methods compared to each other for determining a relative performance. The integrity assessments are scored for the relative effectiveness and ranked as a function of their historical performance. The effectiveness rankings facilitate analyses of the various analyses and whether changes to analyses should be considered. Accordingly, the integrity assessments are ranked as a function of historical performance.

Once the poisoned clusters are classified as such, the labels associated with the data points in the clusters may be repaired or subject to a repair process to facilitate repair of the poisoned activation data. In one embodiment data clusters determined to include known poisoned data with the target labeling are re-labeled or subject to a re-labeling process with the correct, e.g. legitimate, source labels. The re-labeled data may be retained within the neural model. In one embodiment, the poisoned data will be removed from the activation data set and discarded. Accordingly, repairing within the neural model and removing poisoned data from the neural model are efficient and effective methods of resolving a backdoor from an adversarial entity.

It is understood in the art that an adversary may perform an unauthorized and undetected backdoor injection of poisoned data through any means known in the art of information technology security. In one embodiment, the mechanism for poisoning the source data includes adding a backdoor trigger to a portion of the source data and labeling that portion of the source data with the target label. For example, in a diverse sub-population of land vehicle road signs, a portion of stop signs in a source class will receive one or more unauthorized and, at least initially, undetected visual anomalies embedded within the image of a particular training data point which will cause the image to be misclassified as another classification of street signs. For example, in one embodiment, a special sticker may be added to the image of a stop sign that will cause the neural model to misinterpret and misclassify the stop sign in the source class as a target classification with an associated incorrect label of a speed limit sign. In one embodiment, the backdoor trigger is a pattern of inverted pixels somewhere on the images. While a number of the exemplary embodiments described herein include visual data, textual data may be poisoned in a similar manner with one or more textual backdoor triggers. Accordingly, the untrusted training data set may include at least a first portion of the training data set with legitimate labels representative of the associated source class and at least one second portion of the training data set with misclassified labels. In one embodiment, in a text-based classification scheme, the backdoor is inserted into a text-corpus by adding one or more words into some of the training data while mislabeling it to the target label. In other embodiments, where the classification task is different, e.g., a sound track classification task, the backdoor is inherent to that medium.

Embodiments shown and described herein may be in the form of a computer system for use with an intelligent computer platform for providing orchestration of activities across one or more domains to minimize risk. Aspects of the tools (152)-(160) and their associated functionality may be embodied in a computer system/server in a single location, or in one embodiment, may be configured in a cloud based system sharing computing resources. With references to FIG. 12, a block diagram (1200) is provided illustrating an example of a computer system/server (1202), hereinafter referred to as a host (1202) in communication with a cloud based support system, to implement the system, tools, and processes described above with respect to FIGS. 1-11. Host (1202) is operational with numerous other general purpose or special purpose computing system environments or configurations. Examples of well-known computing systems, environments, and/or configurations that may be suitable for use with host (1202) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (1202) may be described in the general context of computer system-executable instructions, such as program modules, being executed by a computer system. Generally, program modules may include routines, programs, objects, components, logic, data structures, and so on that perform particular tasks or implement particular abstract data types. Host (1202) may be practiced in distributed cloud computing environments where tasks are performed by remote processing devices that are linked through a communications network. In a distributed cloud computing environment, program modules may be located in both local and remote computer system storage media including memory storage devices.

Figure 12:
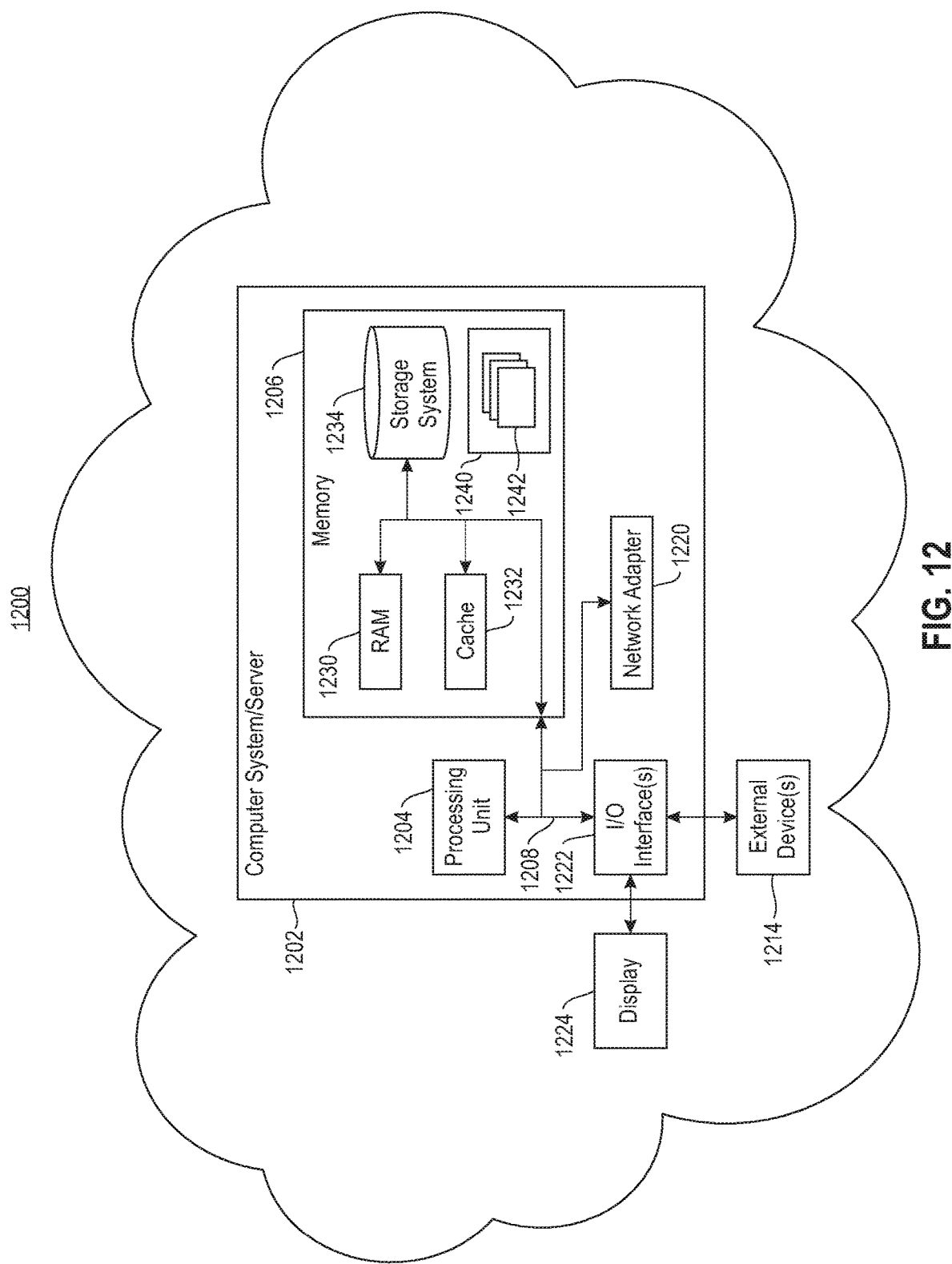
FIG. 12 depicts a block diagram illustrating an example of a computer system/server of a cloud based support system, to implement the system and processes described above with respect to FIGS. 1-11.

As shown in FIG. 12, host (1202) is shown in the form of a general-purpose computing device. The components of host (1202) may include, but are not limited to, one or more processors or processing units (1204), e.g. hardware processors, a system memory (1206), and a bus (1208) that couples various system components including system memory (1206) to processor (1204). Bus (1208) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (902) typically includes a variety of computer system readable media. Such media may be any available media that is accessible by host (902) and it includes both volatile and non-volatile media, removable and non-removable media.

Memory (1206) can include computer system readable media in the form of volatile memory, such as random access memory (RAM) (1230) and/or cache memory (1232). By way of example only, storage system (1234) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (608) by one or more data media interfaces.

Program/utility (1240), having a set (at least one) of program modules (1242), may be stored in memory (1206) by way of example, and not limitation, as well as an operating system, one or more application programs, other program modules, and program data. Each of the operating systems, one or more application programs, other program modules, and program data or some combination thereof, may include an implementation of a networking environment. Program modules (1242) generally carry out the functions and/or methodologies of embodiments to dynamically process an untrusted training data set to identify potentially poisoned data and remove the identified data from a corresponding neural model. For example, the set of program modules (1242) may include the tools (152)-(160) as described in FIG. 1.

Host (1202) may also communicate with one or more external devices (1214), such as a keyboard, a pointing device, etc.; a display (1224); one or more devices that enable a user to interact with host (1202); and/or any devices (e.g., network card, modem, etc.) that enable host (1202) to communicate with one or more other computing devices. Such communication can occur via Input/Output (I/O) interface(s) (1222). Still yet, host (1202) can communicate with one or more networks such as a local area network (LAN), a general wide area network (WAN), and/or a public network (e.g., the Internet) via network adapter (1220). As depicted, network adapter (1220) communicates with the other components of host (1202) via bus (1208). In one embodiment, a plurality of nodes of a distributed file system (not shown) is in communication with the host (1202) via the I/O interface (1222) or via the network adapter (1220). It should be understood that although not shown, other hardware and/or software components could be used in conjunction with host (1202). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (906), including RAM (1230), cache (1232), and storage system (1234), such as a removable storage drive and a hard disk installed in a hard disk drive.

Computer programs (also called computer control logic) are stored in memory (1206). Computer programs may also be received via a communication interface, such as network adapter (1220). Such computer programs, when run, enable the computer system to perform the features of the present embodiments as discussed herein. In particular, the computer programs, when run, enable the processing unit (1204) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

In one embodiment, host (1202) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 13:
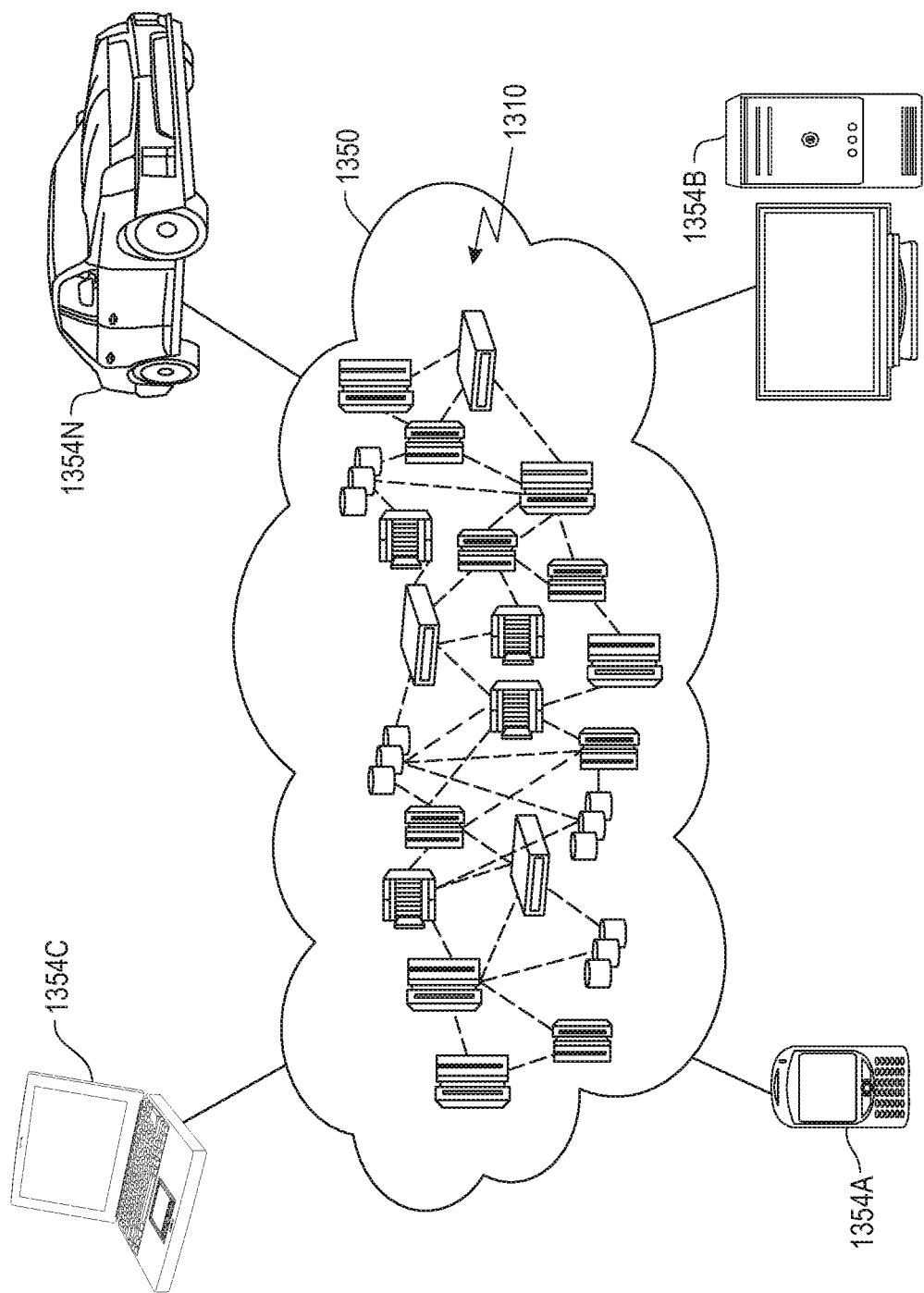
FIG. 13 depicts a block diagram illustrating a cloud computer environment.

Referring now to FIG. 13, an illustrative cloud computing network (1300). As shown, cloud computing network (1300) includes a cloud computing environment (1350) having one or more cloud computing nodes (1310) with which local computing devices used by cloud consumers may communicate. Examples of these local computing devices include, but are not limited to, personal digital assistant (PDA) or cellular telephone (1354A), desktop computer (1354B), laptop computer (1354C), and/or automobile computer system (1354N). Individual nodes within nodes (1310) may further communicate with one another. They may be grouped (not shown) physically or virtually, in one or more networks, such as Private, Community, Public, or Hybrid clouds as described hereinabove, or a combination thereof. This allows cloud computing environment (1300) to offer infrastructure, platforms and/or software as services for which a cloud consumer does not need to maintain resources on a local computing device. It is understood that the types of computing devices (1354A-N) shown in FIG. 13 are intended to be illustrative only and that the cloud computing environment (1050) can communicate with any type of computerized device over any type of network and/or network addressable connection (e.g., using a web browser).

Figure 14:
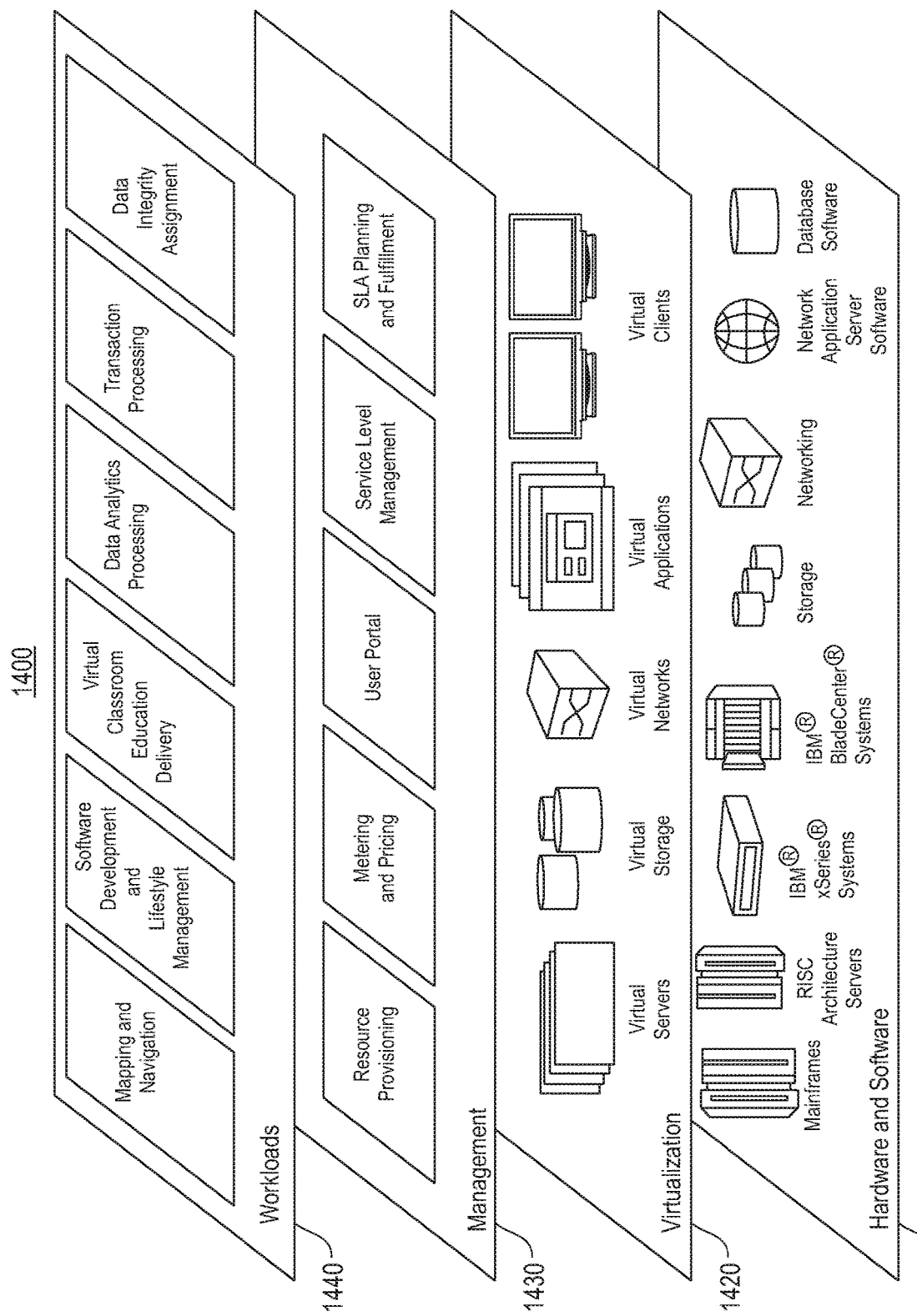
FIG. 14 depicts a block diagram illustrating a set of functional abstraction model layers provided by the cloud computing environment.

Referring now to FIG. 14, a set of functional abstraction layers (1400) provided by the cloud computing network of FIG. 13 is shown. It should be understood in advance that the components, layers, and functions shown in FIG. 14 are intended to be illustrative only, and the embodiments are not limited thereto. As depicted, the following layers and corresponding functions are provided: hardware and software layer (1410), virtualization layer (1420), management layer (1430), and workload layer (1440).

The hardware and software layer (1410) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (1420) provides an abstraction layer from which the following examples of virtual entities may be provided: virtual servers; virtual storage; virtual networks, including virtual private networks; virtual applications and operating systems; and virtual clients.

In one example, management layer (1430) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (1440) provides examples of functionality for which the cloud computing environment may be utilized. Examples of workloads and functions which may be provided from this layer include, but are not limited to: mapping and navigation; software development and life-cycle management; virtual classroom education delivery; data analytics processing; transaction processing; and data integrity assessment.

It will be appreciated that there is disclosed herein a system, method, apparatus, and computer program product for evaluating natural language input, detecting an interrogatory in a corresponding communication, and resolving the detected interrogatory with an answer and/or supporting content.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product is operative to improve the functionality and operation of an artificial intelligence platform to find and distinguish poisoned activation data from legitimate data within a neural network trained with poisonous data.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. Accordingly, the scope of protection of the embodiments is limited only by the following claims and their equivalents.

What is claimed is:
1. A computer system comprising:
a processor operatively coupled to memory; and
an artificial intelligence (AI) platform, in communication with the processor, having machine learning (ML) tools to process an untrusted data set, the tools comprising:

a training manager configured to train a neural model with the untrusted data set;

a ML manager, operatively coupled to the training manager, configured to classify each data point in the untrusted data set using the trained neural model, and to retain activations of one or more designated layers in the trained neural model;

a cluster manager, operatively coupled to the ML manager, configured to apply a clustering technique on the retained activations for each label, and for each cluster to assess integrity of data in the cluster, including to analyze information from the untrusted data set and the clustered activations, the information comprising content of the data in the untrusted data set, noise distribution data with respect to the untrusted data set, and evidence of a preliminary cluster classification; and a classification manager, operatively coupled to the cluster manager, the classification manager configured to assign a poisonous classification or a legitimate classification to the assessed cluster, the assigned classification corresponding to the integrity assessment.

2. The system of claim 1, wherein the integrity assessment of the cluster data further comprises the cluster manager configured to select a preliminary topic assignment or a topic assignment based on the analysis of the analyzed information.

3. The system of claim 2, wherein the topic assignment based on the analysis further comprises the cluster manager configured to analyze topic text indicative of the poisonous classification or the legitimate classification.

4. The system of claim 1, wherein the evidence of the preliminary cluster classification further comprises the cluster manager configured to analyze one or more of:
   known classification data associated with the untrusted data set; and/or
   determined classification data associated with the clustered activations.

5. The system of claim 1, wherein the analysis of the noise distribution data further comprises the cluster manager configured to:
   select the noise distribution data from the group consisting of: noise data extracted through analysis of the untrusted data set and known noise distribution data provided with the untrusted data set.

6. The system of claim 1, wherein the cluster manager is configured to rank the integrity assessments of the clusters as a function of historical performance.

7. The system of claim 1, wherein the training manager is configured to retrain the neural model based on one or more of the integrity assessments.

8. A computer program product to utilize machine learning to process an untrusted data set, the computer program product comprising:
   a computer readable storage medium having program code embodied therewith, the program code executable by a processor to:
   train a neural model with the untrusted data set;
   classify each data point in the untrusted data set using the trained neural model;
   retain activations of one or more designated layers in the trained neural model;
   apply a clustering technique on the retained activations for each label, and for each cluster assess integrity of data in the cluster, including program code executable by the processor to analyze information from the untrusted data set and the clustered activations, the information comprising content of the data in the untrusted data set, noise distribution data with respect to the untrusted data set, and evidence of a preliminary cluster classification;

responsive to the analysis, selectively determine a poisonous classification or a legitimate classification of the untrusted data set; and assign the selectively determined classification to the untrusted data set.

9. The computer program product of claim 8, wherein integrity assessment of the cluster data further comprises program code executable by the processor to select a preliminary topic assignment or a topic assignment based on the analysis of the analyzed information.

10. The computer program product of claim 9, wherein the topic assignment based on the analysis further comprises program code executable by the processor to analyze topic text indicative of the poisonous classification or the legitimate classification.

11. The computer program product of claim 8, wherein the evidence of the preliminary cluster classification further comprises program code executable by the processor to analyze one or more of:
    known classification data associated with the untrusted data set; and/or
    determined classification data associated with the clustered activations.

12. The computer program product of claim 8, wherein analysis of the noise distribution data further comprises program code executable by the processor to:
    select the noise distribution data from the group consisting of: noise data extracted through analysis of the untrusted data set and known noise distribution data provided with the untrusted data set.

13. The computer program product of claim 8, further comprising program code executable by the processor to rank the integrity assessments of the clusters as a function of historical performance.

14. A method comprising:
    receiving, by a neural network, an untrusted data set, each data point of the untrusted data set having a label;
    training a neural model using the untrusted data set;
    classifying each data point in the untrusted data set using the trained neural model, and retaining activations of one or more designated layers in the trained neural model;
    applying a clustering technique on the retained activations for each label;
    assessing integrity of data in the untrusted data set, including analyzing information from the untrusted data set and the clustered activations, the information comprising content of the data in the untrusted data set, noise distribution data with respect to the untrusted data set, and evidence of a preliminary cluster classification;
    responsive to the analysis, selectively determining a poisonous classification or a legitimate classification of the untrusted data set; and
    assigning the selectively determined classification to the untrusted data set.

15. The method of claim 14, wherein the cluster data includes a preliminary topic assignment or a topic assignment based on the analysis of the analyzed information.

16. The method of claim 15, wherein the topic assignment based on the analysis includes topic text indicative of the poisonous classification or the legitimate classification.

17. The method of claim 14, wherein the evidence of the preliminary cluster classification includes one or more of:
   known classification data associated with the untrusted data set; and/or
   determined classification data associated with the clustered activations.

18. The method of claim 14, wherein:
   the noise distribution data is selected from the group consisting of: noise data extracted through analysis of the untrusted data set and known noise distribution data provided with the untrusted data set.

19. The method of claim 14, wherein the assessing integrity of data in the untrusted data set comprises conducting a plurality of integrity assessments, and wherein the method further comprises ranking the integrity assessments of the clusters as a function of historical performance.

20. The method of claim 14, further comprising retraining the neural model based on one or more of the integrity assessments.

* * * * *